United States Patent
Patton et al.

(10) Patent No.: US 11,667,314 B2
(45) Date of Patent: Jun. 6, 2023

(54) COLLAPSIBLE CART

(71) Applicant: OHC IP Holdings, LLC, Eden Prairie, MN (US)

(72) Inventors: Douglas Patton, Irvine, CA (US); Gary Bordenkircher, Eden Prairie, MN (US); Channing Shattuck, Eden Prairie, MN (US)

(73) Assignee: OHC IP Holdings, LLC, Edina, MN (US)

( * ) Notice: Subject to any disclaimer, the term of this patent is extended or adjusted under 35 U.S.C. 154(b) by 0 days.

(21) Appl. No.: 17/752,428

(22) Filed: May 24, 2022

(65) Prior Publication Data

US 2022/0355844 A1 Nov. 10, 2022

Related U.S. Application Data

(63) Continuation of application No. 16/908,023, filed on Jun. 22, 2020, now Pat. No. 11,352,038, which is a
(Continued)

(51) Int. Cl.
*B62B 3/02* (2006.01)
*A47J 37/07* (2006.01)
(Continued)

(52) U.S. Cl.
CPC .......... *B62B 3/022* (2013.01); *A47J 37/0704* (2013.01); *A47J 37/0786* (2013.01); *B62B 3/002* (2013.01);
(Continued)

(58) Field of Classification Search
CPC .......... B62B 3/022; B62B 3/002; B62B 3/025; B62B 3/10; B62B 2202/52; A47J 37/0704; A47J 37/0786
See application file for complete search history.

(56) References Cited

U.S. PATENT DOCUMENTS 1,758,144 A    5/1930  Caselman
3,683,791 A    8/1972  Rast
(Continued)

FOREIGN PATENT DOCUMENTS

CN    201005546    1/2008
CN    202801180    3/2013
(Continued)

OTHER PUBLICATIONS

"Brown Jordan Outdoor Kitchens," by Danver Stainless Outdoor Kitchens information booklet, Apr. 2018 (28 pages).
(Continued)

*Primary Examiner* — Steve Clemmons
(74) *Attorney, Agent, or Firm* — Pauly, DeVries Smith & Deffner LLC

(57) ABSTRACT

A compact and easy to assemble grill cart to support a collapsible grill cart that includes a base portion, to which side frames can be coupled, and that permits the grill cart to be stored in a compact, folded configuration. The side frames of the cart can be expanded or unfolded to provide a stable structure that can support a cooking unit, such as a grill, grill insert, or firebox. Such a collapsible grill cart can also include doors that provide enclosed storage space within the expanded cart and wheels to facilitate transportation.

20 Claims, 13 Drawing Sheets

Related U.S. Application Data continuation of application No. 15/937,666, filed on Mar. 27, 2018, now Pat. No. 10,689,018.

(60) Provisional application No. 62/551,922, filed on Aug. 30, 2017, provisional application No. 62/477,328, filed on Mar. 27, 2017.

(51) Int. Cl.
*B62B 3/00* (2006.01)
*B62B 3/10* (2006.01)

(52) U.S. Cl.
CPC ............... *B62B 3/025* (2013.01); *B62B 3/10* (2013.01); *B62B 2202/52* (2013.01)

(56) References Cited

U.S. PATENT DOCUMENTS

| | | | |
|---|---|---|---|
| 3,802,413 A | 4/1974 | Pepin | |
| 3,893,686 A | 7/1975 | Morgan | |
| 4,057,165 A | 11/1977 | Kardell | |
| 4,211,206 A | 7/1980 | Darbo | |
| 4,321,857 A | 3/1982 | Best | |
| 4,362,093 A | 12/1982 | Griscom | |
| 4,505,495 A | 3/1985 | Foss et al. | |
| 4,569,327 A | 2/1986 | Velten | |
| 4,577,772 A | 3/1986 | Bigliardi | |
| 4,674,647 A | 6/1987 | Gyenge et al. | |
| 4,848,316 A | 7/1989 | Beller | |
| 4,887,836 A | 12/1989 | Simjian | |
| 4,949,701 A | 8/1990 | Krosp et al. | |
| 4,984,515 A | 1/1991 | Pivonka | |
| 5,040,809 A | 8/1991 | Yang | |
| 5,050,731 A | 9/1991 | Baynes et al. | |
| 5,065,734 A * | 11/1991 | Elliott | A47J 37/0763 126/25 R |
| 5,261,550 A | 11/1993 | Karpisek | |
| 5,318,322 A | 6/1994 | Home | |
| 5,462,318 A | 10/1995 | Cooke | |
| 5,473,845 A | 12/1995 | Livingston et al. | |
| 5,579,755 A | 12/1996 | Johnston | |
| 5,692,814 A | 12/1997 | Chou | |
| 5,738,365 A | 4/1998 | McCarthy | |
| 5,884,554 A | 3/1999 | Sprick | |
| 5,941,229 A * | 8/1999 | Schlosser | A47J 37/0713 126/41 R |
| 6,026,751 A | 2/2000 | Tsai | |
| 6,039,039 A | 3/2000 | Pina | |
| 6,079,777 A | 6/2000 | Simmons et al. | |
| 6,189,528 B1 | 2/2001 | Oliver | |
| 6,257,229 B1 | 7/2001 | Stewart et al. | |
| 6,267,111 B1 | 7/2001 | Burton | |
| 6,308,616 B1 | 10/2001 | Johnson | |
| 6,316,837 B1 | 11/2001 | Song | |
| 6,401,953 B2 | 6/2002 | Kofod | |
| 6,439,111 B1 | 8/2002 | Lu | |
| 6,439,220 B1 | 8/2002 | Johnson | |
| 6,439,221 B1 | 8/2002 | Ward et al. | |
| D462,227 S | 9/2002 | Alden et al. | |
| 6,494,419 B2 | 12/2002 | Pai | |
| 6,532,951 B1 | 3/2003 | Sallie et al. | |
| 6,606,986 B2 | 8/2003 | Holland et al. | |
| 6,619,600 B1 | 9/2003 | Johnson et al. | |
| 6,651,361 B1 | 11/2003 | Porter et al. | |
| D485,467 S | 1/2004 | Pai | |
| 6,708,601 B2 | 3/2004 | Home | |
| D491,414 S | 6/2004 | Nichols et al. | |
| 6,792,880 B2 | 9/2004 | Tsai | |
| 6,823,858 B1 | 11/2004 | Chen | |
| 6,916,028 B2 | 7/2005 | Shapiro | |
| 7,080,640 B2 | 7/2006 | Sanders et al. | |
| D533,011 S | 12/2006 | Pai | |
| D541,576 S | 5/2007 | Lutz | |
| D546,616 S | 7/2007 | Tseng | |
| D546,624 S | 7/2007 | Pai | |
| D547,108 S | 7/2007 | Tseng | |
| D547,109 S | 7/2007 | Tseng | |
| D549,035 S | 8/2007 | Chung | |
| 7,360,783 B2 | 4/2008 | Home | |
| 7,562,897 B1 | 7/2009 | Sherman et al. | |
| D615,799 S | 5/2010 | Best et al. | |
| D618,951 S | 7/2010 | Tzeng | |
| 7,753,047 B1 | 7/2010 | Trammell | |
| 7,856,924 B1 * | 12/2010 | Stihi | A47J 37/0731 126/25 AA |
| 8,042,829 B2 | 10/2011 | Hailston et al. | |
| 8,316,837 B2 | 11/2012 | Malumyan | |
| 8,347,874 B2 | 1/2013 | Bruno et al. | |
| 8,479,928 B2 | 7/2013 | Tanabe et al. | |
| 8,522,769 B2 | 9/2013 | Ducate et al. | |
| 8,602,017 B2 | 12/2013 | May et al. | |
| RE44,770 E | 2/2014 | Nichols et al. | |
| 8,839,780 B1 | 9/2014 | Bennett et al. | |
| D737,096 S | 8/2015 | Lee et al. | |
| 9,101,244 B2 | 8/2015 | Samaras | |
| 9,187,108 B2 | 11/2015 | Bruno et al. | |
| 9,211,036 B2 | 12/2015 | May et al. | |
| 9,316,401 B1 | 4/2016 | Guste | |
| 9,392,904 B2 | 7/2016 | Garman | |
| D798,645 S | 10/2017 | Lira-Nunez et al. | |
| D799,885 S | 10/2017 | Torchon | |
| 9,783,216 B2 | 10/2017 | Alden et al. | |
| 9,788,690 B2 | 10/2017 | Rosian | |
| D803,613 S | 11/2017 | Dominique | |
| 9,817,108 B2 | 11/2017 | Kuo et al. | |
| D805,332 S | 12/2017 | Price et al. | |
| D805,819 S | 12/2017 | Price et al. | |
| D807,105 S | 1/2018 | Moss | |
| D820,010 S | 6/2018 | Reyes | |
| 10,689,018 B2 | 6/2020 | Patton et al. | |
| 10,702,099 B2 | 7/2020 | O'Shaughnessy et al. | |
| 10,772,466 B2 | 9/2020 | O'Shaughnessy et al. | |
| D899,176 S | 10/2020 | Lien | |
| 10,966,569 B2 | 4/2021 | O'Shaughnessy et al. | |
| 11,033,147 B2 | 6/2021 | O'Shaughnessy et al. | |
| 11,045,049 B2 | 6/2021 | O'Shaughnessy et al. | |
| D923,996 S | 7/2021 | O'Shaughnessy et al. | |
| D924,002 S | 7/2021 | O'Shaughnessy et al. | |
| D926,519 S | 8/2021 | O'Shaughnessy et al. | |
| D928,544 S | 8/2021 | O'Shaughnessy et al. | |
| 11,096,521 B2 | 8/2021 | O'Shaughnessy et al. | |
| 11,352,038 B2 | 6/2022 | Patton et al. | |
| 11,457,770 B2 | 10/2022 | O'Shaughnessy et al. | |
| 11,464,363 B2 | 10/2022 | O'Shaughnessy et al. | |
| 2001/0015137 A1 | 8/2001 | O'Grady et al. | |
| 2003/0136781 A1 | 7/2003 | Rumpel | |
| 2004/0020482 A1 | 2/2004 | Chen | |
| 2004/0065313 A1 | 4/2004 | Thompson | |
| 2004/0183266 A1 | 9/2004 | Cambiano et al. | |
| 2006/0000468 A1 | 1/2006 | Zelek et al. | |
| 2006/0049725 A1 | 3/2006 | Simon | |
| 2006/0225725 A1 | 10/2006 | Rinaldo | |
| 2006/0272630 A1 | 12/2006 | Sanders et al. | |
| 2007/0089724 A1 * | 4/2007 | Home | A47J 37/0704 126/9 R |
| 2007/0152414 A1 | 7/2007 | Home | |
| 2008/0066730 A1 | 3/2008 | Ducate | |
| 2008/0163862 A1 | 7/2008 | Cartwright | |
| 2008/0245357 A1 | 10/2008 | Meether et al. | |
| 2009/0165771 A1 | 7/2009 | Selk | |
| 2010/0031950 A1 | 2/2010 | Paslawski | |
| 2010/0269814 A1 | 10/2010 | May et al. | |
| 2010/0326938 A1 | 12/2010 | Zhu et al. | |
| 2011/0025005 A1 | 2/2011 | Howell | |
| 2011/0041831 A1 | 2/2011 | Dettloff | |
| 2011/0168155 A1 * | 7/2011 | Gallo | A47J 37/0713 126/25 AA |
| 2011/0168168 A1 | 7/2011 | Schneider | |
| 2011/0168593 A1 | 7/2011 | Neufeld et al. | |
| 2012/0012091 A1 | 1/2012 | Home | |
| 2012/0017890 A1 | 1/2012 | May et al. | |
| 2012/0024280 A1 | 2/2012 | LaPorta et al. | |
| 2013/0049311 A1 | 2/2013 | Metters et al. | |
| 2013/0112088 A1 | 5/2013 | May | |

(56) References Cited

U.S. PATENT DOCUMENTS

| | | | |
|---|---|---|---|
| 2013/0134842 A1 | 5/2013 | Kassanoff et al. | |
| 2013/0312732 A1 | 11/2013 | Brennan | |
| 2014/0014087 A1 | 1/2014 | Rosa et al. | |
| 2014/0069412 A1 | 3/2014 | Garman | |
| 2014/0090635 A1 | 4/2014 | May | |
| 2014/0165992 A1 | 6/2014 | May et al. | |
| 2014/0261394 A1* | 9/2014 | Evans | F24C 3/14 126/9 B |
| 2015/0013667 A1 | 1/2015 | Ho et al. | |
| 2015/0020796 A1 | 1/2015 | Garman et al. | |
| 2015/0023839 A1 | 1/2015 | Snyder et al. | |
| 2015/0118006 A1 | 4/2015 | Wallace-Riley | |
| 2015/0136113 A1 | 5/2015 | Polter et al. | |
| 2015/0165634 A1 | 6/2015 | Golomb | |
| 2015/0342401 A1 | 12/2015 | Alden et al. | |
| 2016/0039326 A1 | 2/2016 | Smith et al. | |
| 2016/0100714 A1 | 4/2016 | Dokhanian et al. | |
| 2016/0208837 A1 | 7/2016 | Chang | |
| 2016/0305172 A1 | 10/2016 | Grisendi | |
| 2017/0085114 A1 | 3/2017 | Gao et al. | |
| 2017/0095114 A1 | 4/2017 | O'Shaughnessy et al. | |
| 2017/0143162 A1 | 5/2017 | Olsen | |
| 2017/0159941 A1 | 6/2017 | Kahler et al. | |
| 2018/0008095 A1 | 1/2018 | Bennett et al. | |
| 2018/0132660 A1 | 5/2018 | Suchevits | |
| 2018/0141576 A1 | 5/2018 | Leffler et al. | |
| 2018/0280677 A1 | 10/2018 | Knight | |
| 2018/0290677 A1 | 10/2018 | Patton et al. | |
| 2018/0310765 A1 | 11/2018 | May et al. | |
| 2019/0380533 A1 | 12/2019 | Lien | |
| 2020/0000277 A1 | 1/2020 | O'Shaughnessy et al. | |
| 2020/0000278 A1 | 1/2020 | O'Shaughnessy et al. | |
| 2020/0000279 A1 | 1/2020 | O'Shaughnessy et al. | |
| 2020/0000280 A1 | 1/2020 | O'Shaughnessy et al. | |
| 2020/0000281 A1 | 1/2020 | O'Shaughnessy et al. | |
| 2020/0000283 A1 | 1/2020 | O'Shaughnessy et al. | |
| 2020/0390279 A1 | 12/2020 | O'Shaughnessy et al. | |
| 2020/0391779 A1 | 12/2020 | Patton et al. | |
| 2021/0045579 A1 | 2/2021 | O'Shaughnessy et al. | |
| 2021/0353099 A1 | 11/2021 | O'Shaughnessy et al. | |
| 2023/0084244 A1 | 3/2023 | O'Shaughnessy et al. | |
| 2023/0087213 A1 | 3/2023 | O'Shaughnessy et al. | |

FOREIGN PATENT DOCUMENTS

| | | |
|---|---|---|
| CN | 202807780 | 3/2013 |
| CN | 104234616 | 12/2014 |
| CN | 204618011 | 9/2015 |
| CN | 205632566 | 10/2016 |
| CN | 107198467 | 9/2017 |
| CN | 305874918 | 6/2020 |
| CN | 305874919 | 6/2020 |
| CN | 305874920 | 6/2020 |
| CN | 211685163 | 10/2020 |
| CN | 215361401 | 12/2021 |
| CN | 215457418 | 1/2022 |
| CN | 215457419 | 1/2022 |
| JP | 2006223643 | 8/2006 |
| KR | 200173343 | 4/2000 |
| KR | 20050102437 | 10/2005 |
| KR | 20130000879 | 2/2013 |
| TW | 309958 | 7/1997 |
| WO | 2004054415 | 7/2004 |
| WO | 2004072539 | 8/2004 |
| WO | 2015089551 | 6/2015 |
| WO | 2016149408 | 11/2016 |
| WO | 2017095746 | 6/2017 |
| WO | 2017160338 | 9/2017 |
| WO | 2018183373 | 10/2018 |
| WO | 2020005946 | 1/2020 |
| WO | 2020005969 | 1/2020 |
| WO | 2020005972 | 1/2020 |
| WO | 2020005976 | 1/2020 |
| WO | 2020005978 | 1/2020 |
| WO | 2020005981 | 1/2020 |

OTHER PUBLICATIONS

"Char-Broil Modular Outdoor Kitchen," Char Broil webpage Apr. 29, 2019, retrieved on Aug. 8, 2019, https://www.charbroil.com/grills/outdoor-kitchens/modular-outdoor-kitchen (4 pages).

"Danver's Post and Panel System," Danver webpage Jun. 1, 2018, retrieved on Aug. 8, 2019, https://danver.com/blog/post-and-panel-system/ (2 pages).

File History for U.S. Appl. No. 16/910,966 downloaded Jul. 19, 2022 (232 pages).

File History for U.S. Appl. No. 16/450,303 downloaded Jul. 18, 2022 (245 pages).

File History for U.S. Appl. No. 17/333,753 downloaded Jul. 18, 2022 (198 pages).

File History for U.S. Appl. No. 16/450,356 downloaded Jul. 18, 2022 (248 pages).

File History for U.S. Appl. No. 16/450,388 downloaded Jul. 18, 2022 (215 pages).

File History for U.S. Appl. No. 16/450,493 downloaded Jul. 18, 2022 (260 pages).

File History for U.S. Appl. No. 16/450,510 downloaded Jul. 18, 2022 (276 pages).

File History for U.S. Appl. No. 16/908,023 downloaded Jul. 18, 2022 (570 pages).

File History for U.S. Appl. No. 15/262,733 downloaded Jul. 18, 2022 (386 pages).

File History for U.S. Appl. No. 15/937,666 downloaded Jul. 18, 2022 (390 pages).

File History for U.S. Appl. No. 17/008,331 downloaded Jul. 18, 2022 (206 pages).

File History for U.S. Appl. No. 16/450,541 downloaded Jul. 18, 2022 (267 pages).

File History for U.S. Appl. No. 29/695,966 downloaded Jul. 18, 2022 (244 pages).

File History for U.S. Appl. No. 29/695,969 downloaded Jul. 18, 2022 (298 pages).

File History for U.S. Appl. No. 29/695,973 downloaded Jul. 18, 2022 (237 pages).

File History for U.S. Appl. No. 29/695,976 downloaded Jul. 18, 2022 (262 pages).

"First Correction Office Action," for Chinese Patent Application No. 201990000810.3 dated Sep. 8, 2021 (3 pages) with English Translation.

"First Office Action," for Chinese Patent Application No. 201610876505.3 dated Dec. 18, 2018 (14 pages) with English Translation.

"First Office Action," for Chinese Patent Application No. 201990000823.0 dated Sep. 30, 2021 (5 pages) with English Summary.

"Fourth Office Action," for Chinese Patent Application No. 201610876505.3 dated Sep. 30, 2020 (11 pages) with English Summary.

"International Preliminary Report on Patentability," for PCT Application No. PCT/US2016/051319 dated Sep. 27, 2018 (11 pages).

"International Preliminary Report on Patentability," for PCT Application No. PCT/US2018/024628 dated Oct. 10, 2019 (13 pages).

"International Preliminary Report on Patentability," for PCT Application No. PCT/US2019/038993 dated Jan. 7, 2021 (9 pages).

"International Preliminary Report on Patentability," for PCT Application No. PCT/US2019/039024 dated Jan. 7, 2021 (10 pages).

"International Preliminary Report on Patentability," for PCT Application No. PCT/US2019/039027 dated Jan. 7, 2021 (9 pages).

"International Preliminary Report on Patentability," for PCT Application No. PCT/US2019/039034 dated Jan. 7, 2021 (8 pages).

"International Preliminary Report on Patentability," for PCT Application No. PCT/US2019/039039 dated Jan. 7, 2021 (10 pages).

"International Preliminary Report on Patentability," for PCT Application No. PCT/US2019/039042 dated Jan. 7, 2021 (9 pages).

(56) References Cited

OTHER PUBLICATIONS

"International Search Report and Written Opinion," for PCT Application No. PCT/US2016/051319 dated Dec. 8, 2016 (14 pages).
"International Search Report and Written Opinion," for PCT Application No. PCT/US2018/024628 dated Jul. 11, 2018 (16 pages).
"International Search Report and Written Opinion," for PCT Application No. PCT/US2019/038993 dated Oct. 15, 2019 (13 pages).
"International Search Report and Written Opinion," for PCT Application No. PCT/US2019/039024 dated Oct. 15, 2019 (14 pages).
"International Search Report and Written Opinion," for PCT Application No. PCT/US2019/039027 dated Oct. 15, 2019 (13 pages).
"International Search Report and Written Opinion," for PCT Application No. PCT/US2019/039034 dated Oct. 15, 2019 (12 pages).
"International Search Report and Written Opinion," for PCT Application No. PCT/US2019/039039 dated Oct. 16, 2019 (14 pages).
"International Search Report and Written Opinion," for PCT Application No. PCT/US2019/039042 dated Oct. 16, 2019 (13 pages).
"Modular Outdoor Kitchen," Char-Broil Medallion Series Outdoor Kitchen information retrieved from https://www.charbroil.com/grills/modular-outdoor-kitchen on Aug. 8, 2019 (4 pages).
"Office Action," for Chinese Patent Application No. 202022193760.2 dated Apr. 19, 2021 (4 pages) with English Translation.
"Origami Carts and Racks," Origami webpage Apr. 20, 2016, retrieved on Dec. 9, 2019 via web.archive.org, https://origamirack.com (5 pages).
"Origami Kitchen Island Cart with Wheels," Description and Product Specs at least as early as Aug. 9, 2019 (5 pages).
"Second Office Action," for Chinese Patent Application No. 201610876505.3 dated Aug. 29, 2019 (4 pages) with English Translation.
"Second Office Action," for Chinese Patent Application No. 201990000823.0 dated Feb. 8, 2022 (4 pages) with English Summary.
"Sunco Outdoor Kitchen," Mar. 16, 2018 URL <https://www.sunco.com.au/shop/bbqs/sc100-xspec-four-burner-outdoor-kitchen/> (3 pages).
"Third Office Action," for Chinese Patent Application No. 201610876505.3 dated Mar. 19, 2020 (8 pages) with English Translation.
"Traeger Wood Pellet Grills," Product Listing found on www.traegergrills.com at least as early as Aug. 9, 2019 (4 pages).
"Traeger Wood Pellet Grills," Traeger Grills webpage Apr. 7, 2006, retrieved on Dec. 9, 2019 via web.archive.org, https://www.traegergrills.com (2 pages).
"Tytus Charcoal Grey Stainless Steel 4 Burner Free Standing Grill," first available 2020, TytusGrills.com, [online], [site visited Nov. 27, 2020], Available from internet URL: https://tytusgrills.com/collections/grills/products/tytus-charcoal-grey-stainless-steel-4- burner-free-standing-grill (Year: 2020), 5 pages.
"Tytus Grills," first available 2020, TytusGrills.com, [online], [site visited Dec. 1, 2020], Available from internet URL: https://tytusgrills.com/collections/grills (Year: 2020), 3 pages.
"Tytus TI404MGGLP Spec Sheet," first available 2020, AppliancesConnection.com, [online], [site visited Nov. 27, 2020], Available from internet URL: https://static.appliancesconnection.com/attachments/D5f524932e12f6.pdf (Year: 2020), 2 pages.
"Tytus TI400MWLP Spec Sheet," first available 2020, SamsClub.com, [online], [site visited Nov. 27, 2020], Available from internet URL: https://content.syndigo.com/asset/9f341 0f8-d6c3-48c1 -a02c-f5bdbb9f989b/original.pdf (Year: 2020), 2 pages.
"Tytus TI400SSBLP341 Spec Sheet," first available 2020, AppliancesConnection.com, [online], [site visited Nov. 27, 2020], Available from internet URL: https://static.appliancesconnection.com/attachments/D5f524e4ae6c38.pdf (Year: 2020), 2 pages.
"Tytus User Manual 4-Burner Gas Grill and 4-Burner Island Gas Grill with Side Cabinets," first available 2020, TytusGrills.com, [online], [site visited Dec. 1, 2020], Available from internet URL: https://tytusgrills.com/pages/manualsanddocuments (Year: 2020), 60 pages).
Colon, Linda M."Danver's Post and Panel System is a Hit with Architects, Builders, Developers & Designers," Danver Outdoor Kitchens Jun. 1, 2018 (2 pages).
Morgan, Grant "Nationwide Marketing Group Announces Its Partnership with Tytus Grills," first available online Oct. 9, 2019, TytusGrills.com, [online], [site visited Nov. 27, 2020], available from internet URL: https://www.twice.com/retailing/nationwide-marketing-group-announces-its-partnership-with-tytus-grills (year: 2019).
"Decision on Rejection," for CN Patent Application 201990000823.0, dated Jun. 17, 2022 (5 pages) with English summary.
"Ex Parte Quayle Action," for U.S. Appl. No. 17/951,768 dated Mar. 24, 2023 (30 pages)

* cited by examiner

FIG. 1E
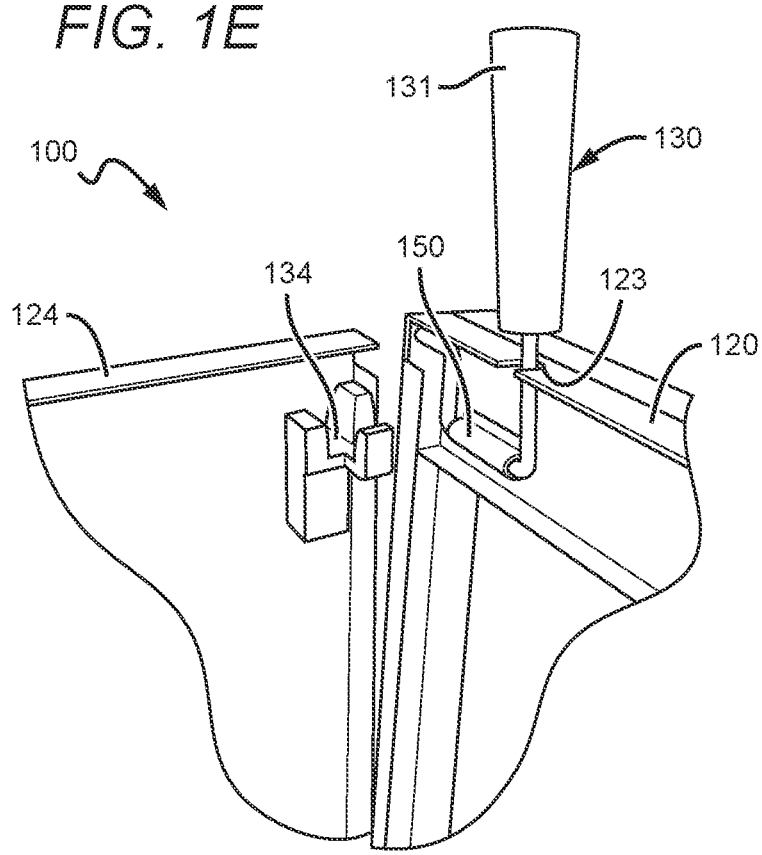
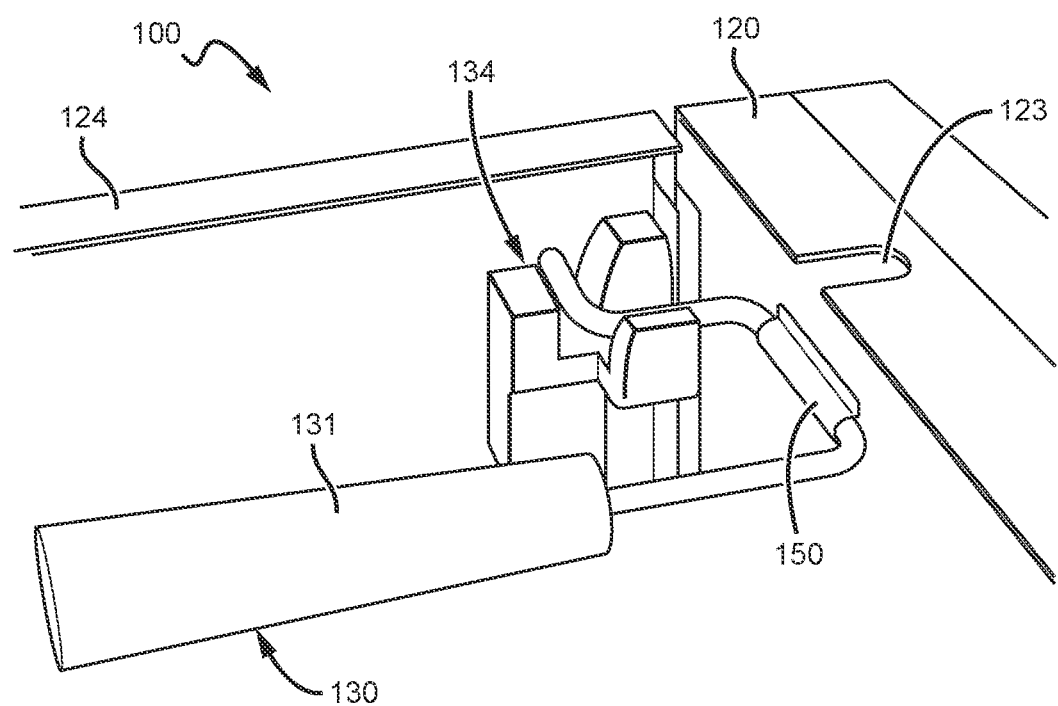
FIG. 1F

COLLAPSIBLE CART

This application is a continuation of U.S. patent application Ser. No. 16/908,023, filed Jun. 22, 2020, which is a continuation of U.S. patent application Ser. No. 15/937,666, filed Mar. 27, 2018, which claims the benefit of priority to U.S. Provisional Patent Application No. 62/477,328, filed Mar. 27, 2017, and U.S. Provisional Patent Application No. 62/551,922, filed Aug. 30, 2017. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is collapsible carts for barbeques and other grills.

BACKGROUND

The following description includes information that may be useful in understanding the present invention. It is not an admission that any of the information provided herein is prior art or relevant to the presently claimed invention, or that any publication specifically or implicitly referenced is prior art.

Grilling is a cooking style that is especially popular in the United States. But grills are not particularly portable or easy to set up, in part because the framework for the grill is large and fastened to the grill in a way that makes assembly and disassembly difficult.

Attempts have been made to design grills that are easy to assemble after unloading from shipping containers. For example, U.S. Pat. No. 8,602,017 to May describes a grill comprising a firebox assembly, which includes a firebox base and a firebox hood, and a cart assembly. The cart assembly includes a large number of pieces: support assemblies, hinges, and linking members. However, assembly still requires numerous steps, and some parts must be screwed together. Moreover, the firebox assembly cannot be collapsed to reduce the volume of the disassembled grill and cart during storage and shipping.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Another potential solution disclosed in U.S. Pat. No. 8,316,837 to Malumyan is to mount the grill on a foldable stand. However, even in the folded configuration, the wheels and handle of the grill take-up extra space. Moreover, the stand requires two hands to set-up, and in at least some circumstances, one-handed assembly is desirable.

Still another potential solution is described in U.S. Pat. No. 5,065,734 to Elliott, which discusses a portable grill having collapsible legs (albeit in a reverse manner). In addition, U.S. Patent Publ. nos. 2006/0225725 to Rinaldo and 2004/0020482 to Chen describe similar concepts. However, all of these assemblies fail to prevent attachment of a grill unless and until the cart or supporting structure is secured.

Thus, a need exists for a portable, collapsible stand-alone grill cart having safety features to prevent unintentional collapse.

SUMMARY OF THE INVENTION

The present invention provides apparatus, systems, and methods of an easy to assemble and collapsible grill cart for a barbeque or other grill, which is configured to ensure proper assembly of the cart to help avoid accident or injury from improper assembly. A more detailed explanation of the inventive subject matter can be found below. In practice, the grill cart has been assembled in less than three minutes, with no tools required.

In one aspect of the inventive subject matter, the collapsible cart preferably includes a base frame, to which each side frame of the cart can be coupled, and configured to move from a collapsed, first position to an upright second position. Preferably, the cart has four side frames: left and right side frames that oppose one another, and back and front side frames that oppose one another.

In preferred embodiments, the front side frame can comprise first and second cam locks or other locking devices that are disposed on opposing sides of the front side frame. The cam locks advantageously can provide a mechanical advantage, preferably at least 5:1, such that rotation of the cam lock does not require substantial strength. The first and second locking devices are configured to secure the front side frame to the left and right side frames, respectively, when the first and second locking devices are actuated from a first, non-engaged position to a second, engaged position. Thus, in such embodiment, a first locking device can secure the front side frame to the left side frame when the first locking device is moved or rotated from the first, non-engaged position to the second, engaged position. Similarly, the second locking device can secure the front side frame to the right side frame when the second locking device is moved or rotated from the first, non-engaged position to the second, engaged position.

It is especially preferred that at least one, and preferably both, of the first and second locking devices are configured such that a portion of each of the locking devices extends upwardly above an upper-most surface of the front side frame when (i) the front side frame is in the second, upright (non-collapsed) position and (ii) the locking device is in the first, non-engaged position. In this manner, the portion of the locking devices extending upwardly above the front side frame act to prevent someone from prematurely attaching a barbeque or other grill to the cart before the cart is assembled and secured. This is a critical safety mechanism, as a person may otherwise attach the grill before the cart is ready, which could injure the person if the grill fell and/or the cart collapsed.

Although the first and second locking devices are preferably coupled with the front side frame, it is contemplated that the first locking device could be coupled with the left side frame, and the second locking device could be coupled with the right side frame. In such embodiment, the first locking device can secure the left side frame to the front side frame when the first locking device is moved or rotated from the first, non-engaged position to the second, engaged position. Similarly, the second locking device can secure the right side frame to the front side frame when the second locking device is moved or rotated from the first, non-engaged position to the second, engaged position.

Preferably, the first side frame is fastened to the third and fourth side frames via first and second cam locks or other locking mechanisms disposed on the first side frame. Upon actuation of each of the cam locks or other locking mechanisms (e.g., moving each of the first and second cam locks from a first position to a second position), the first side frame is fastened to the third and fourth side frames, thereby strengthening the structure and preventing unintentional collapse of the first, third or fourth side frames. Each of the third and fourth side frames can also each include a cam lock or other locking mechanism that fastens to the second side frame to thereby fasten the third and fourth side frames to the second side frame.

Advantageously, the first and second cam locks or other locking mechanisms can project upwardly from the first side frame to inhibit attachment of the grill or barbeque until the cam locks or other locking mechanisms are actuated into the locked, second position. This helps ensure the first and second cam locks or other locking mechanisms are engaged, and the cart can thereby support the grill, prior to mounting the grill to the cart.

Carts described in this application enhance the portability of a grill by providing a collapsible framework that can be quickly and easily packed into a compact configuration for either storage or transportation, and can also be quickly and easily deployed/unfolded to support a barbeque or other grill.

Thus, the base frame and side frames can be readily stored and transported in a compact configuration in which these frames are essentially parallel to one another. The collapsible cart can then be expanded when desired, for example, through rotation of the side frames with respect to the base frame, to provide a stable structure/cart suitable for supporting a barbeque, grill, or other cooking unit.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1E depicts a close-up view of a portion of the grill cart of FIG. 1C with the front and right side frames in an upright position, and the locking mechanism in a first, unsecured position.

FIGS. 1F-1G depict a close-up view of the portion of the grill cart of FIG. 1E with the locking mechanism in a second, locked position.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The grill carts described in this application enhance the portability of a grill by providing a detachable framework that can be quickly and easily be assembled or packed into a compact configuration for either storage or transportation, while ensuring safety of the user who is assembling the grill cart.

FIGS. 1A-1K illustrates one embodiment of a grill cart 100 in a collapsed state having a barbeque 110 stacked on top of the grill cart 100. This could be, for example, how the grill cart 100 and barbeque 110 can be positioned during shipment and prior to assembly.

Figure 1A:
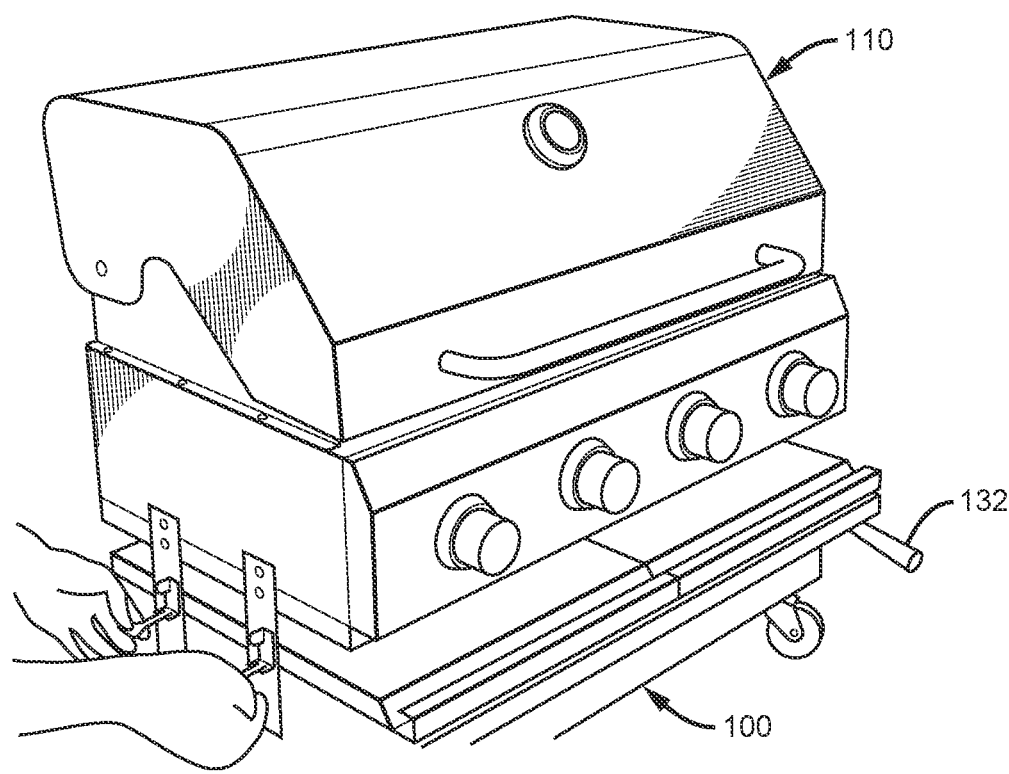
FIGS. 1A-1B depict one embodiment of a grill cart before it is deployed.
Figure 1B:
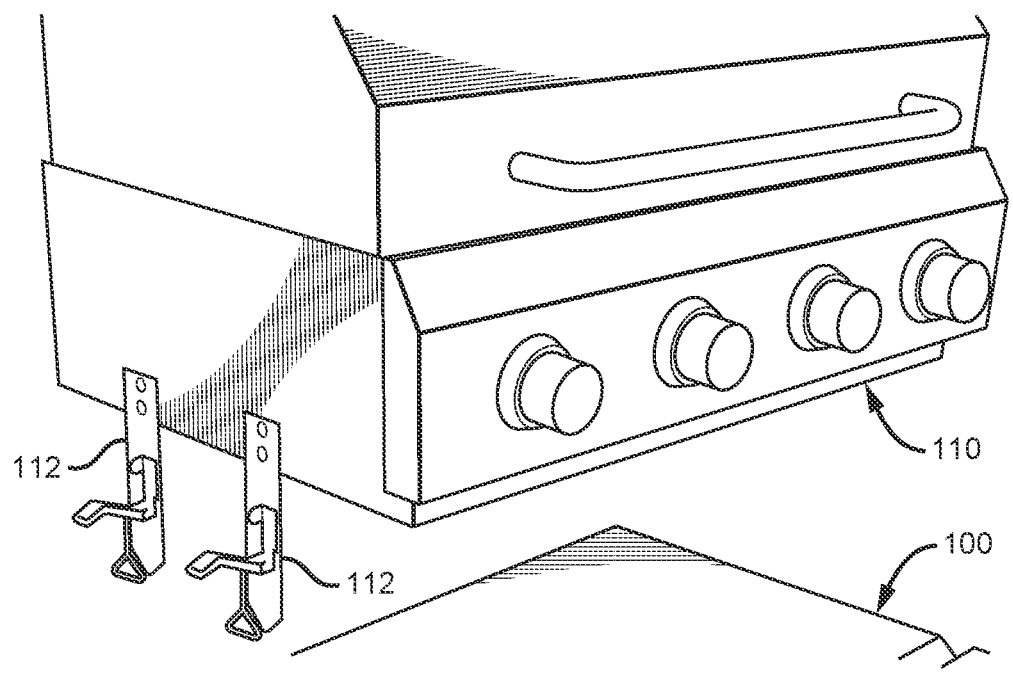

As shown in FIG. 1B, the barbeque 110 is removed from the grill cart 100 to allow the grill cart 100 to be assembled. Advantageously, the barbeque 110 can include a set of downward projections 112 that act as feet on which the barbeque 110 can rest and thereby raise the barbeque 110 from the ground or other surface when not positioned on top of the grill cart 100. Preferably the barbeque 110 has four or more projections 112 (e.g., two on opposing left and right sides of the barbeque) to ensure proper balance, although two or more projections 112 are contemplated depending on the specific size and dimension of the projections 112. The projections 112 also advantageously ensure a proper connection to the cart 100 as explained in detail below.

Figure 1C:
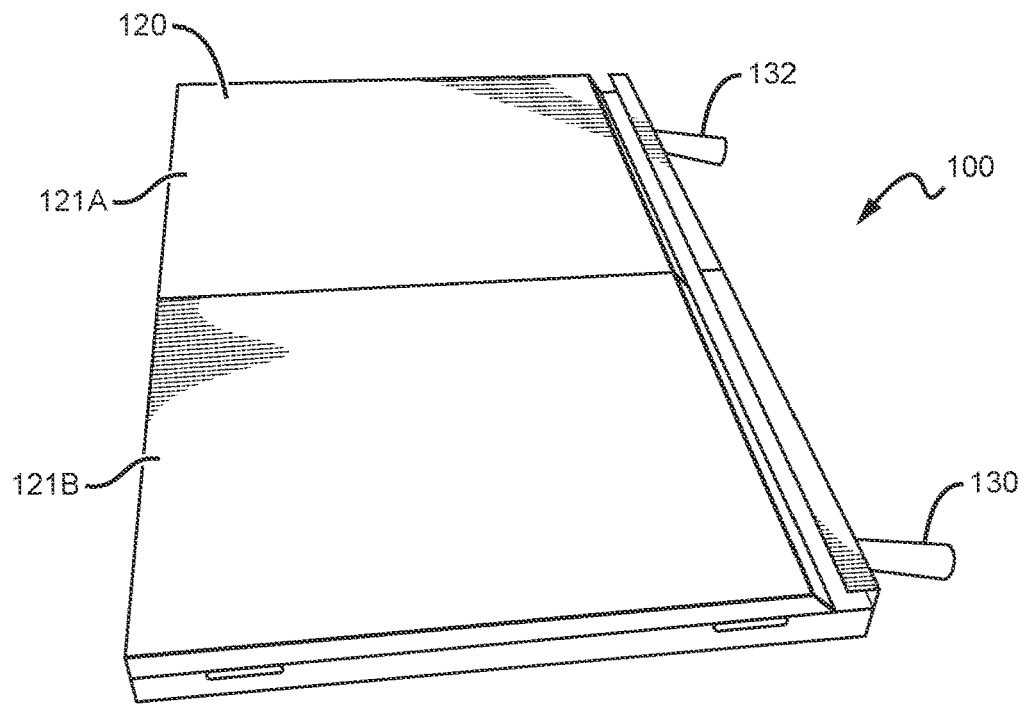
FIG. 1C depicts the grill cart of FIG. 1A in a collapsed position.
Figure 1D:
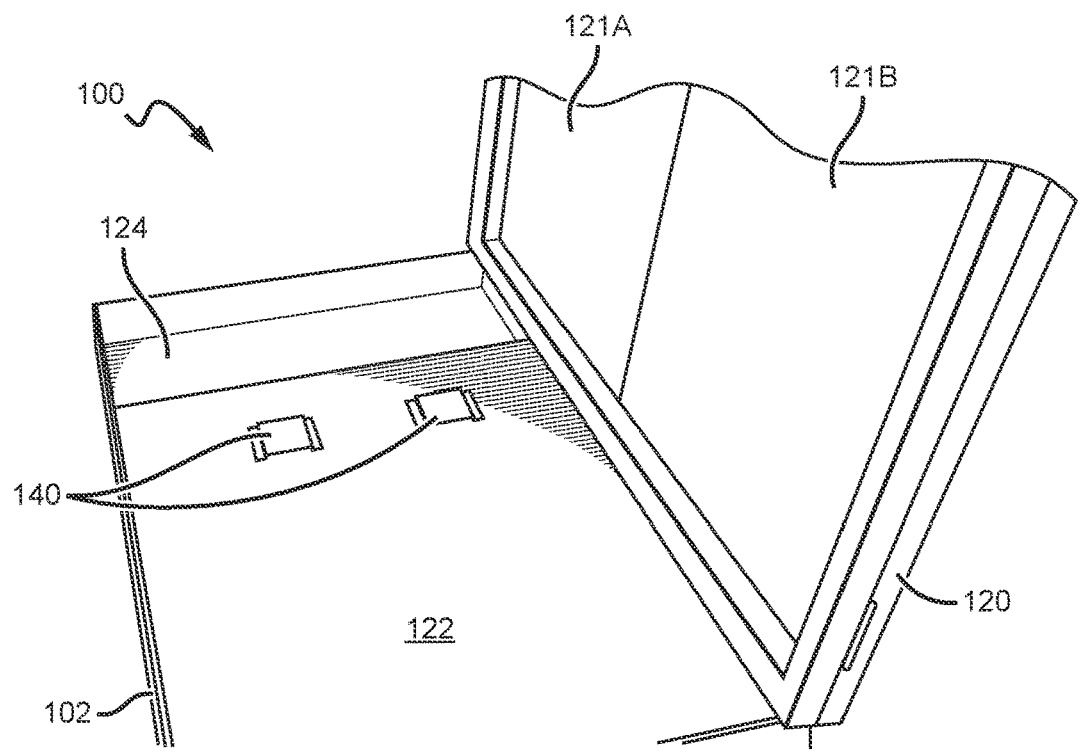
FIG. 1D depicts the grill cart of FIG. 1C with a front side frame in an upright position.

FIG. 1C illustrates grill cart 100 in a collapsed configuration with the front side frame 120 on top. As shown, locking mechanisms 130, 132 extend outwardly from a side of the front side frame 120, such that the locking mechanisms 130, 132 will extend upwardly when the front side frame 120 is rotated from its collapsed position to an upright position (approximately, a 90 degree rotation), as shown in FIG. 1D. As can be seen, the front side frame 120 preferably includes first and second doors 121A,121B that can swing open to allow access within the grill cart 100 once assembled.

The front side frame 120 is preferably rotatably coupled to a base frame 102 of the cart 100, such that the front side frame 120 can be rotated from a collapsed position shown in FIG. 1C to an upright position shown in FIG. 1D. Likewise, left and right side frames 122, 124 are also preferably rotatably coupled to the base frame 102, such that each of the left and right side frames 122, 124 can be rotated from a collapsed position shown in FIG. 1D to the assembled position shown in FIG. 1K. Each of the left and right side frames 122, 124 can also include a slot 140 on an outer or inner surface that is defined by a curved metal piece, with each of the slots 140 configured to receive one of the projections 112 of the barbeque 110. FIG. 1D shows the slots 140 on the outer surface of the left side frame 122.

In preferred embodiments, the base frame 102 is a rectangular metal frame. The base frame 102 can optionally include structural components to provide sheer strength (not pictured), but those components can generally be made unnecessary by using a strong material to build the base frame 102 (e.g., steel). Preferably, base frame 102 is approximately the same size as the barbeque 110 that the cart 100 is designed to support. However, the base frame 102 can vary in size without departing from the inventive concepts described in this application. It is more important that the base frame 102 provide stability for the cart 100 and barbeque 110 than it have a particular size and shape.

It is contemplated that each of the side frames 120, 122, 124, 126 can be coupled with the base frame 102 by, for example, hinges, by slots fitting over pegs, or by any other commercially suitable mechanism that can allow the side frames 120, 122, 124, 126 to rotatably couple to the base frame 102. It is sufficient that the side frames 120, 122, 124, 126 are coupled with the base frame 102 such that they can rotate to lie against the base frame 102 and also be rotated upward to form approximately a right angle to the plane of the base frame 102.

Figure 1G:
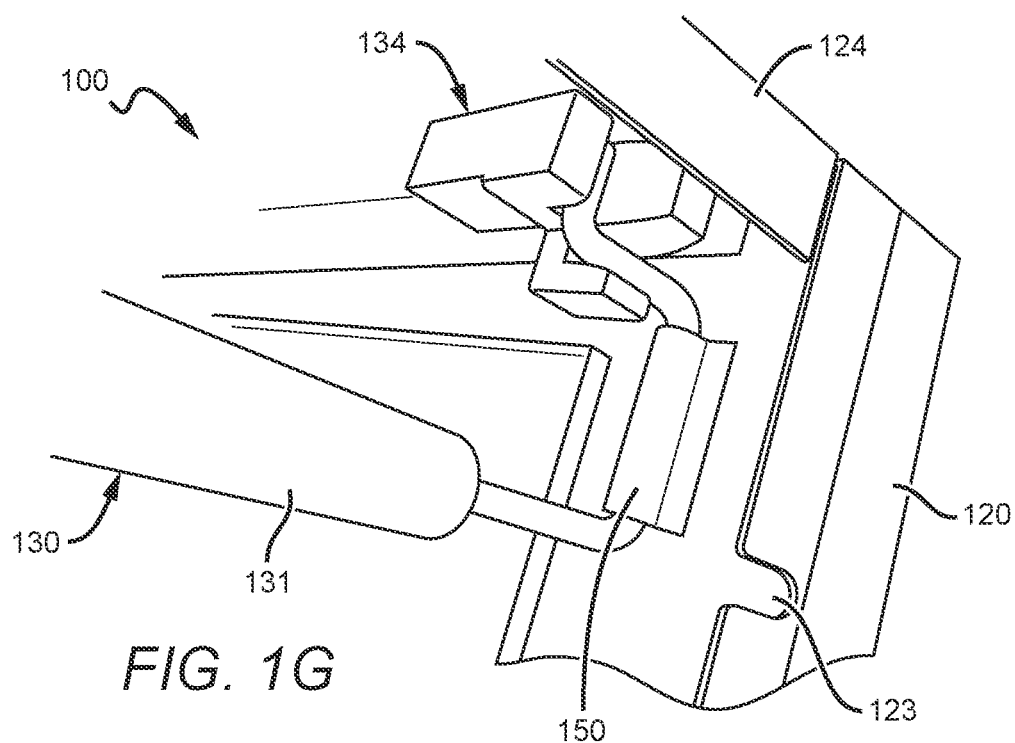

FIGS. 1E-1G illustrates close up views of the right side frame 124 and the front side frame 120, with the locking mechanism 130 disposed on the front side frame 120. The right side frame 124 preferably includes a cam lock receiver 134 that has at least an L-shaped recess 180 that corresponds with the L-shaped portion of the locking mechanism 130. Preferably, the L-shaped recess 180 is defined by one or more walls or peaks. Although three are shown in the Figures, it is contemplated that a single wall or peak could be used, two walls or peak, or four or more walls or peaks, without departing from the scope of the invention. As can be seen in FIG. 1E, when the locking mechanism 130 is in the first position, handle 131 of the locking mechanism 130 extends upwardly from a top or uppermost portion of the front side frame 120. As shown, the locking mechanism 130 can extend through a notch 123 in the front side frame 124. This advantageously prevents barbeque 110 from being secured to the grill cart 100 until the locking mechanism 130 is rotated to the second position, thereby ensuring the barbeque 110 is not placed on top of the grill cart 100 until the locking mechanisms are secured.

When the locking mechanism 130 is rotated to the second position shown in FIGS. 1F-1G, the L-shaped portion of the locking mechanism 130 rests in the L-shaped recess, which thereby pulls the right side frame 124 and front side frame 120 more closely together if needed, and prevents the right side frame 124 and front side frame 120 from moving with respect to one another due to the tight fit of the cam lock 130 within the recess of the receiver 134. Preferably, the locking mechanism 130 is coupled with the front side frame 120 at pivot point 150. As shown, in the second position, handle 131 of the locking mechanism 130 extends sideways and no longer prevents barbeque 110 from being placed on top of the cart 100.

Figure 1H:
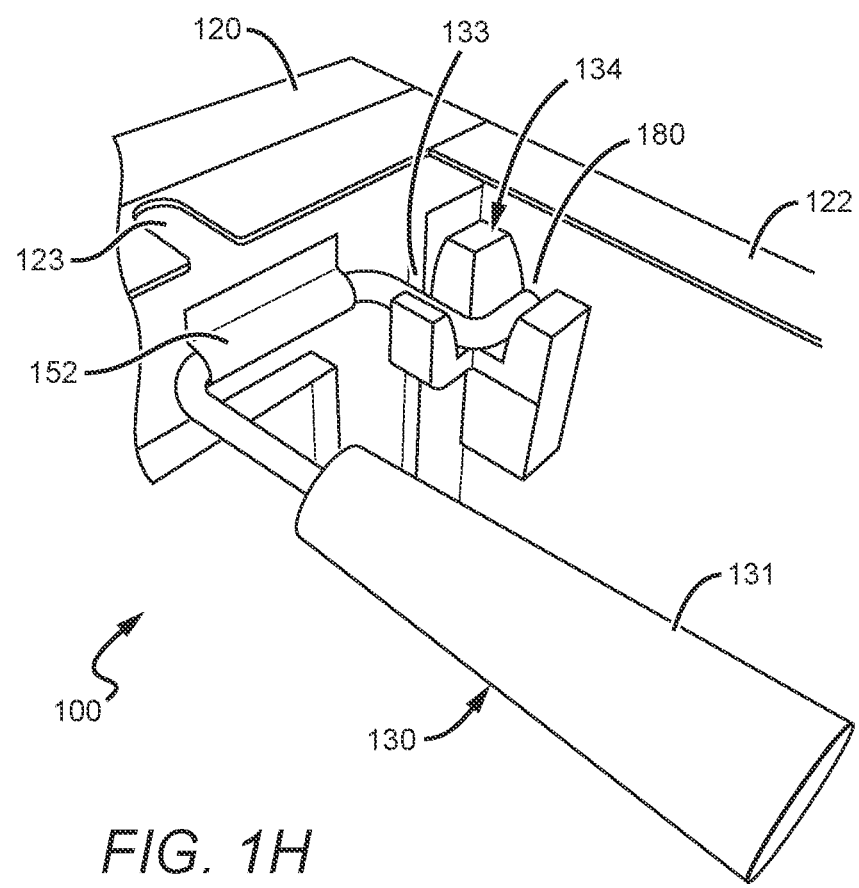
FIG. 1H depicts a close-up view of a different portion of the grill cart of FIG. 1E with the front and left side frames in an upright position, and the locking mechanism in a second, locked position.

FIG. 1H illustrates a close up view of the left side frame 122 and the front side frame 120, with locking mechanism 130 also disposed on the front side frame 120, albeit at the opposite side. Right side frame 124 preferably includes a cam lock receiver 134 that has at least an L-shaped recess that corresponds with the L-shaped portion of the locking mechanism 130. Preferably, the locking mechanism 130 is coupled with the front side frame 120 at pivot point 151. Front side frame 120 can include a second notch 123 through which locking mechanism 130 can extend when the locking mechanism 130 is in the first position.

Figure 1I:
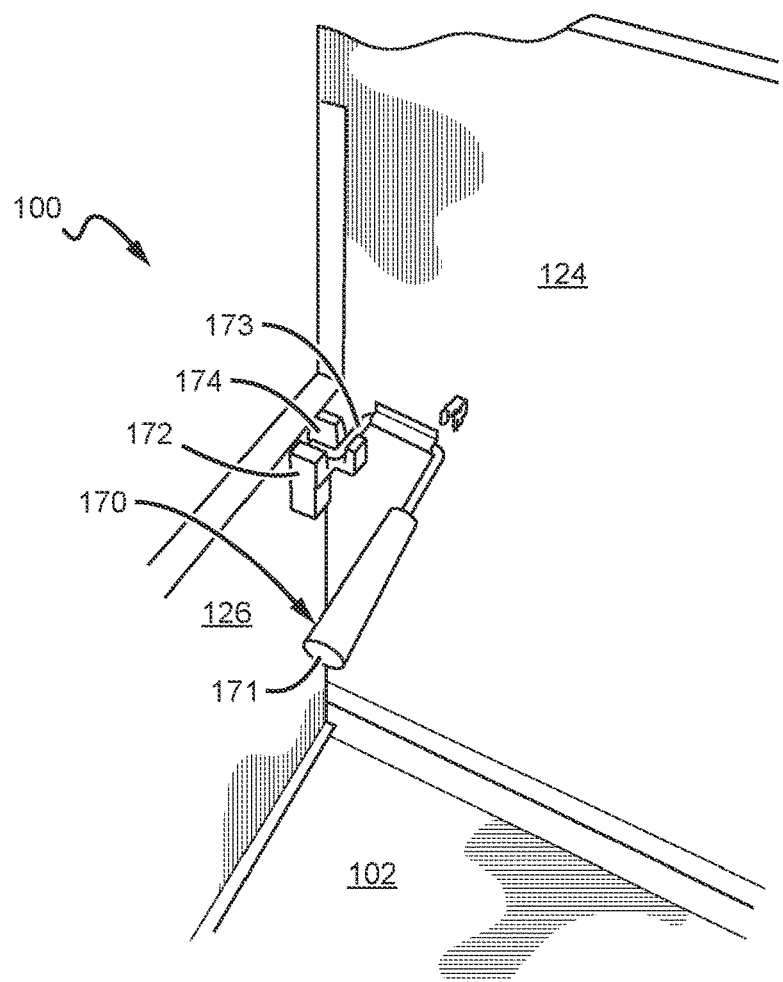
FIG. 1I depicts a close-up view of a different portion of the grill cart of FIG. 1E with the back and right side frames in an upright position, and the locking mechanism in a second, locked position.
Figure 1J:
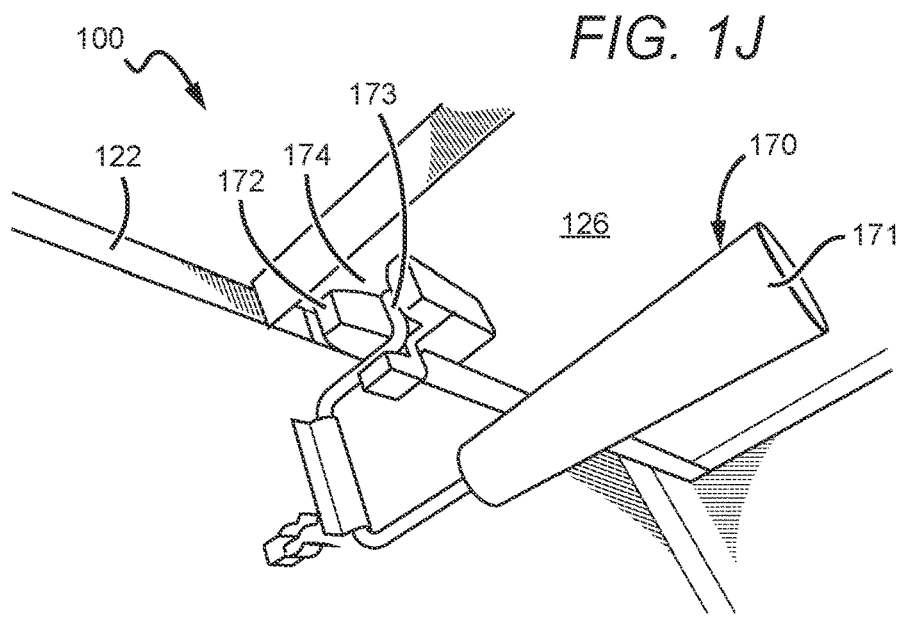
FIG. 1J depicts a close-up view of a different portion of the grill cart of FIG. 1E with the back and left side frames in an upright position, and the locking mechanism in a second, locked position.

FIG. 1I illustrates the back side frame 126 and the right side frame 124, which can be locked together by rotating locking mechanism 170, such as by applying a force to handle 171 of locking mechanism 170. Locking mechanism 170 is preferably rotatably coupled to the right side frame 124. To achieve this, the back side frame 126 preferably includes a locking mechanism receiver 172 that has at least an L-shaped recess 174 that corresponds with an L-shaped portion 173 of the locking mechanism 170. As shown in FIG. 1J, left side frame 122 can also include a locking mechanism 170 rotatably coupled to the left side frame 122, and that couples with a second locking mechanism receiver 172 on the back side frame 126 to thereby secure the back side frame 126 to the left side frame 122 similar to that described with respect to FIG. 1H.

Figure 1K:
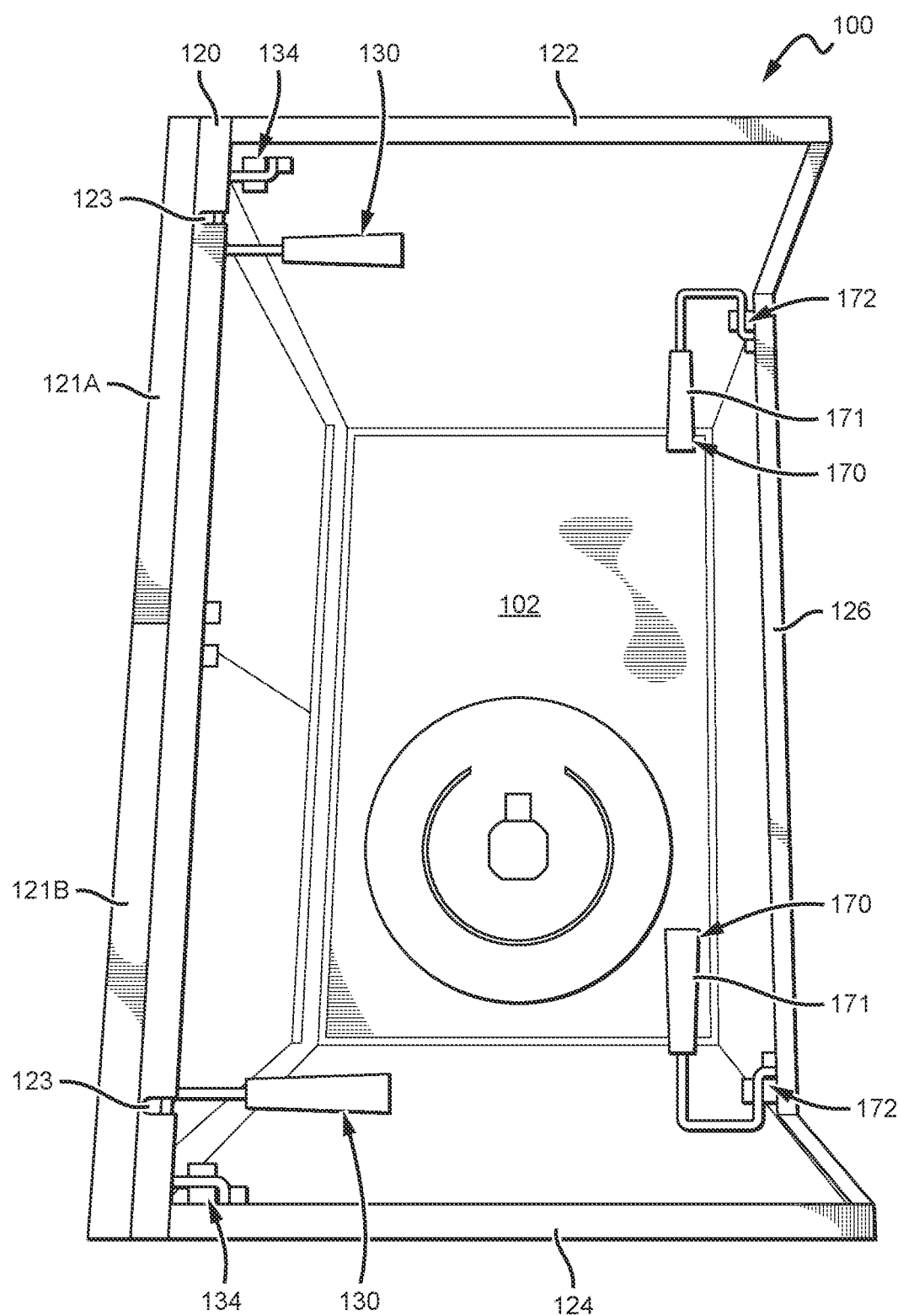
FIG. 1K depicts a top view of an assembled grill cart of FIG. 1E, with each of the locking mechanisms in a second, locked position.

FIG. 1K illustrates grill cart 100 in an assembled state with each of the front side frame 120, left side frame 122, right side frame 124, and back side frame 126 in an upright position (e.g., one that is preferably perpendicular to a surface of the base frame 102). As can be seen, the locking mechanisms 130, 170 are each engaged with a respective receivers (e.g., 134, 172), such that the front side frame 120 is secured to the left side frame 122 and right side frame 124 by locking mechanisms 130, and the back side frame 126 is secured to the left side frame 122 and right side frame 124 by locking mechanisms 170. Thus, when each of the side frames 120, 122, 124, 126 is in an upright position, the side frames 120, 122, 124, 126 collectively provide a platform for a barbeque 110 to rest on.

In any embodiment described above, an additional top piece can be used to couple the tops of the left, right, and front side frames. This top piece can be a flat piece that creates a top platform or surface, for example. The top piece can couple to the tops of the side frames by fitting around the tops of the side frames and optionally covering the tops of the side frames (e.g., the top piece has slots that receive the tops of the side frames, where the slots are either configured as through holes or as upside down cup pieces).

In some embodiments, it is contemplated that each side frame can be locked automatically by a fastener in the upright position when the side frame reaches that position, although other locking mechanisms (e.g., pin/dowel in hole, spring snap clip, screw) are contemplated. Such fasteners include, for example, pin and slot mechanisms, clutches, collars, cams, shock cords, spring-buttons, snap collars, and set knobs.

It is contemplated that the barbeque could have recessed portions on its bottom surface to allow for handles disposed on the doors of the front side frame, and permit the barbeque to abut the front side frame when the cart is in a collapsed position. To prevent damage to the front side frame, it is also contemplated that a plastic extrusion could be used.

Figure 2A:
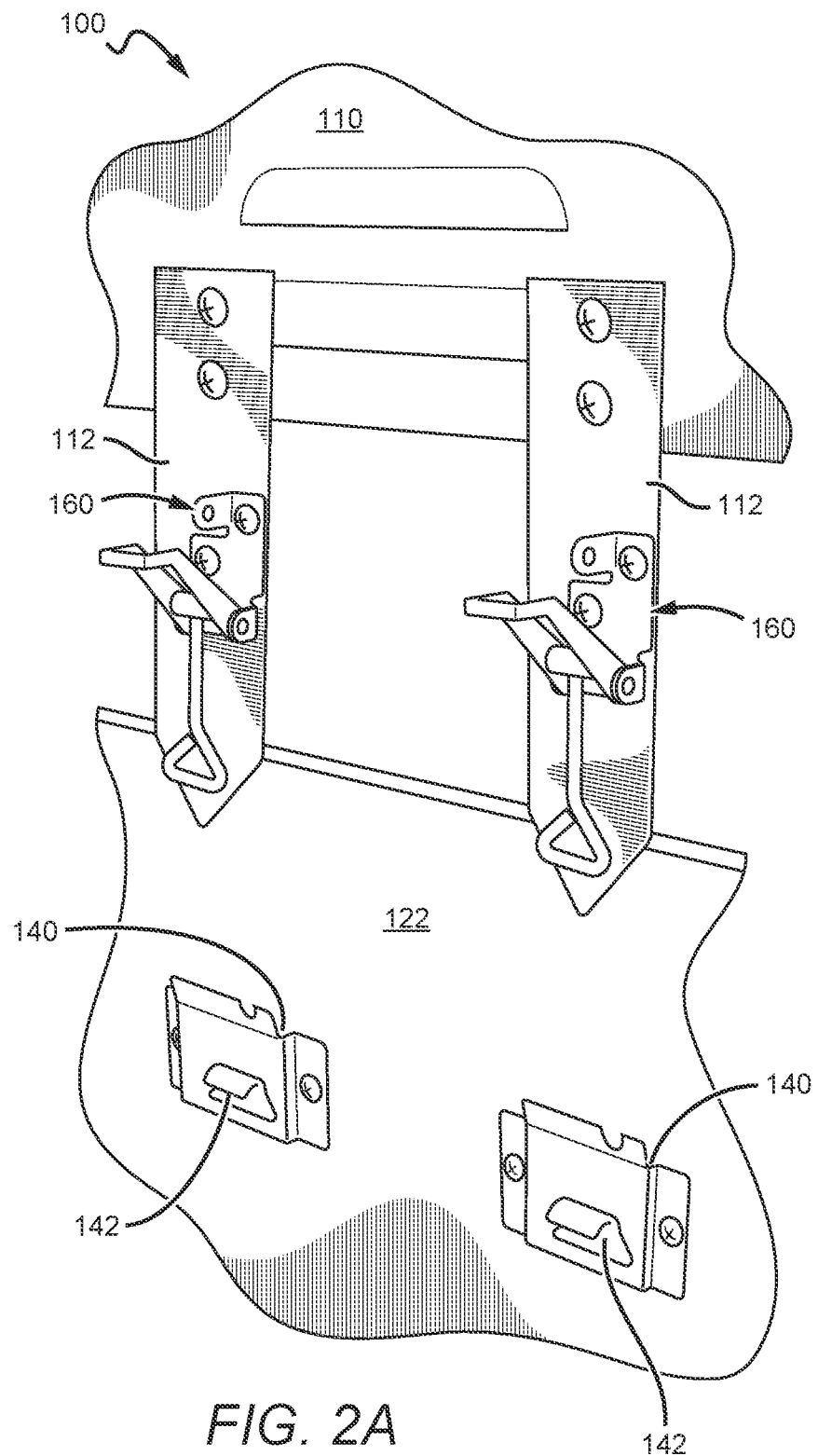
FIG. 2A depicts the assembled grill cart of FIG. 1K and a grill before they are coupled together.
Figure 2C:
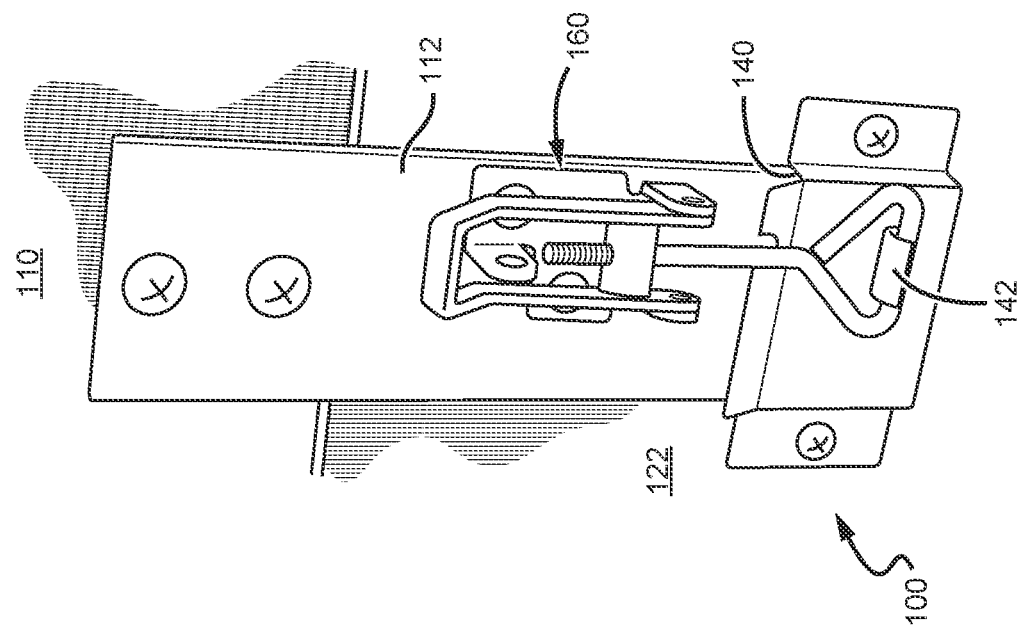
FIG. 2C depicts the assembled grill cart and grill shown in FIG. 2A where the latch is secured.
Figure 2B:
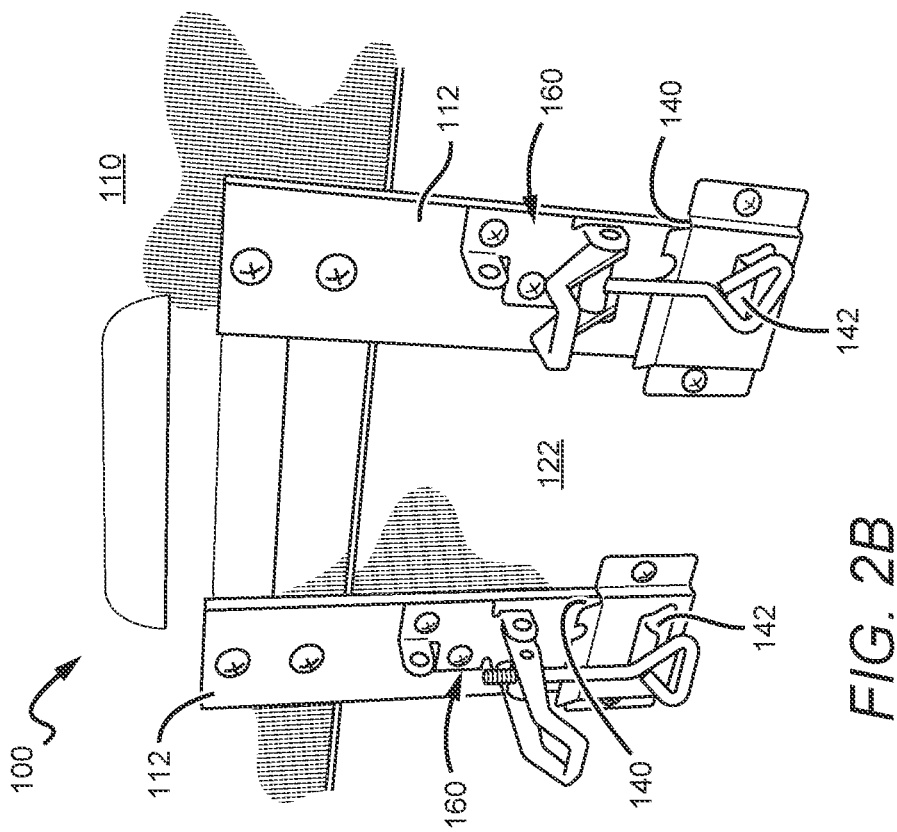
FIG. 2B depicts the assembled grill cart and grill shown in FIG. 2A where projections on the grill are disposed in slots on the grill cart.

As shown in FIGS. 2A-2C, barbeque 110 can be secured to the grill cart 100 by first inserting each of the projections 112 into a slot 140 on the grill cart, and then using a latch 160 or fastener to secure the barbeque 110 to the grill cart 100. As discussed above, barbeque 110 preferably includes a set of downward projections 112 that act as feet for the barbeque 110 to thereby raise the barbeque 110 from the ground or other surface when not positioned on top of the cart 100. Preferably, the barbeque 110 has at least four projections 112 (e.g., two on the left side and two on the right side) to ensure proper balance, although the specific number of position of the projections can vary so long as the barbeque is able to remain in a stable position when placed on a flat surface.

The projections 112 are sized such that they can be inserted into slots 140 disposed on left and right side frames 120, 122 of the cart 100. Although shown disposed on outer surfaces of the left and right side frames 120, 122, it is contemplated that the slots could be disposed on an inner surface of either or both left and right side frames 120, 122, or be disposed within one or both of the left and right side frames 120, 122.

For example, as shown in FIGS. 2A-2C, the projections 112 can be inserted into the slots 140 disposed on the exterior surface of the left side frame 122 and the right side frame 124. As the projections 112 are inserted into the slots 140, the barbeque 110 is thereby prevented from sliding or rotating from its position on top of the cart 100. Insertion of the projections 112 into the slots 140 can be seen through the progression from FIG. 2A to the full insertion shown in FIG. 2B.

Once the projections 112 are inserted into the slots 140 and the barbeque 110 rests on the top of the cart 100, the barbeque 110 can secured to the cart 100 via one or more latches 160 or other fasteners. As shown in FIG. 2C, in a preferred embodiment the latches 160 comprise a movable portion that can engage a hook 142 coupled to one of the left and right side frames 120, 122. Thus, in the embodiment shown in the FIGS. 2A-2C, each of the latches 160 can be moved to engage a hook 142, and then locked in placed such as shown in FIG. 2C, such that the engagement of the latches 160 with the hooks 142 prevents upward movement of the barbeque 110 relative to the cart 100, and thereby also prevent removal of the projections 112 from the slots 140.

To create a cart 100 that has some mobility, the base frame 102 can additionally include wheels, which could be placed at each corner of the base frame 102, for example. However, in some embodiments mobility is not as important and the wheels can be replaced with static structural components (e.g., pegs, or extended portions of the base frame 102).

Typically, contemplated grills comprise firebox hoods and firebox bases. Each firebox base further comprises one or more griddles and one or more burners, wherein the burners are configured to couple with gas regulators, which in turn are configured to couple with standard propane tanks, for example.

In some embodiments of the inventive subject matter the grill cart can include one or more side table(s). Such a side table can slide outwards from the top portion of the cart. Alternatively, such a side table can pivot into position and be stabilized by a brace or similar mechanism. In embodiments where a firebox, grill, and/or grill insert forms part of the cart assembly such a side table can extend or pivot from a lower portion of the firebox, grill, and/or grill insert. It is contemplated that the side table could also be used as a support to wheel the barbeque and grill cart, for example, using wheels coupled with the base frame.

In FIGS. 3A-3I, another embodiment of a collapsible grill cart 300 is shown. Grill cart 300 can be packaged with a barbeque 310 on top of the collapsed cart 300. In such embodiments, it is contemplated that the barbeque 310 can be secured to the grill cart 300 via latches 360, which coupled with hooks 342 on the cart 300.

Figure 3A:
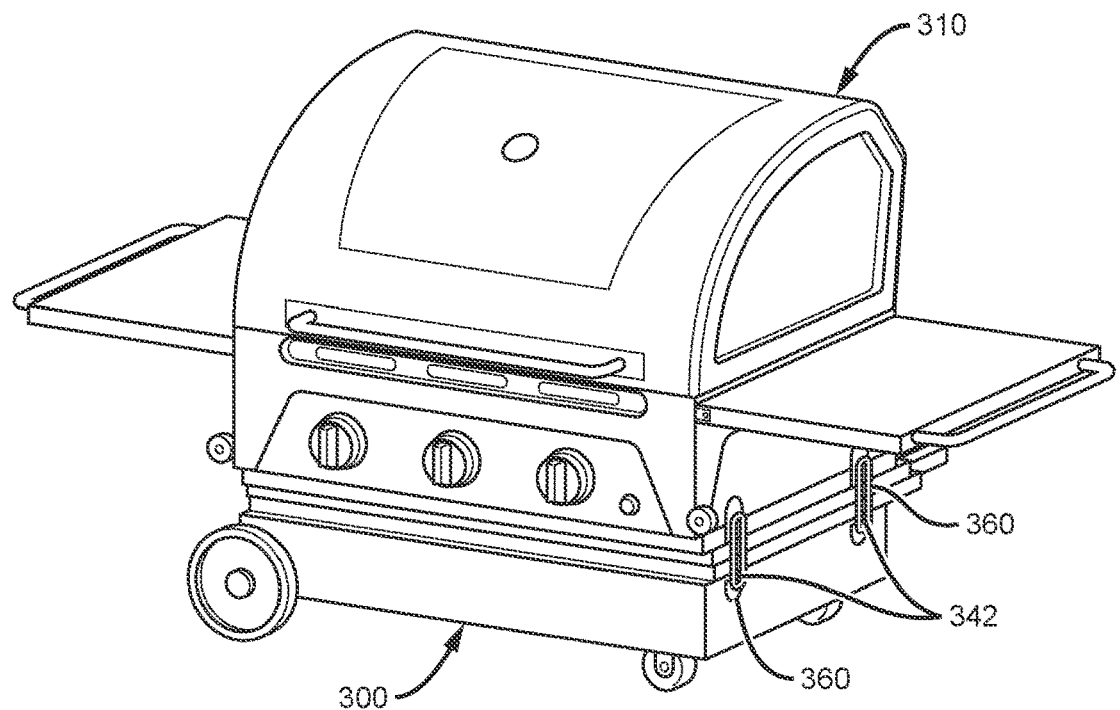
FIG. 3A depicts another embodiment of a grill cart before it is deployed.
Figure 3B:
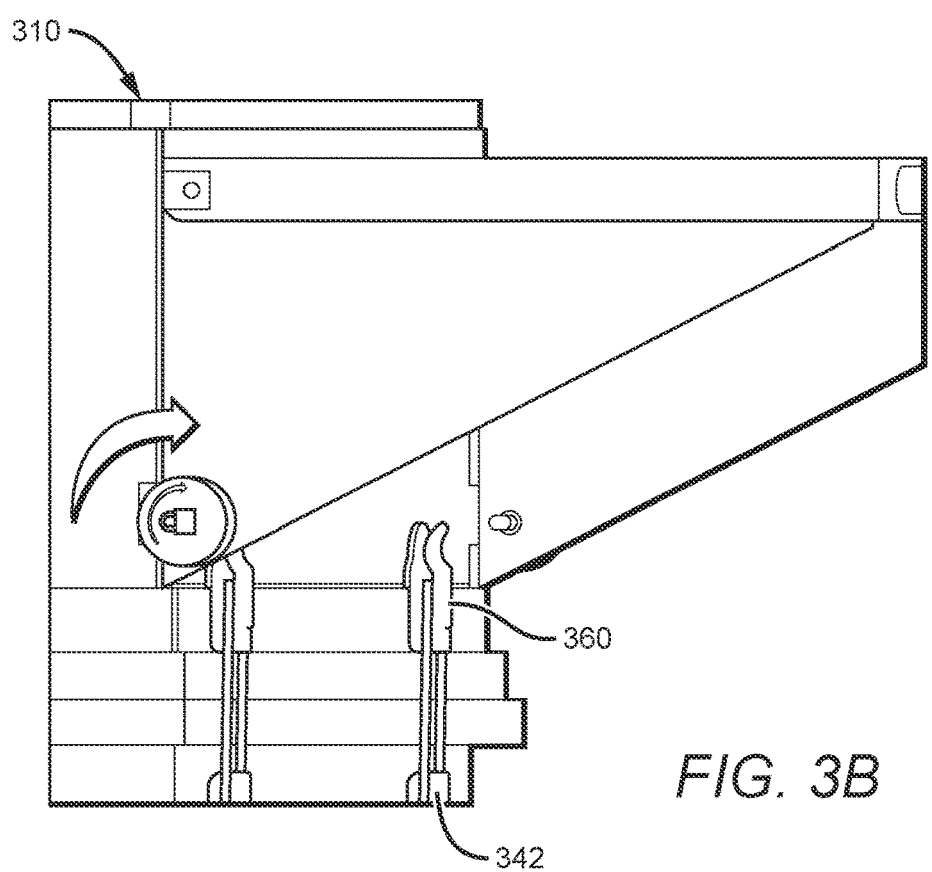
FIG. 3B depicts an enlarged view of the grill cart of FIG. 3A with the supports extended for a side panel.
Figure 3C:
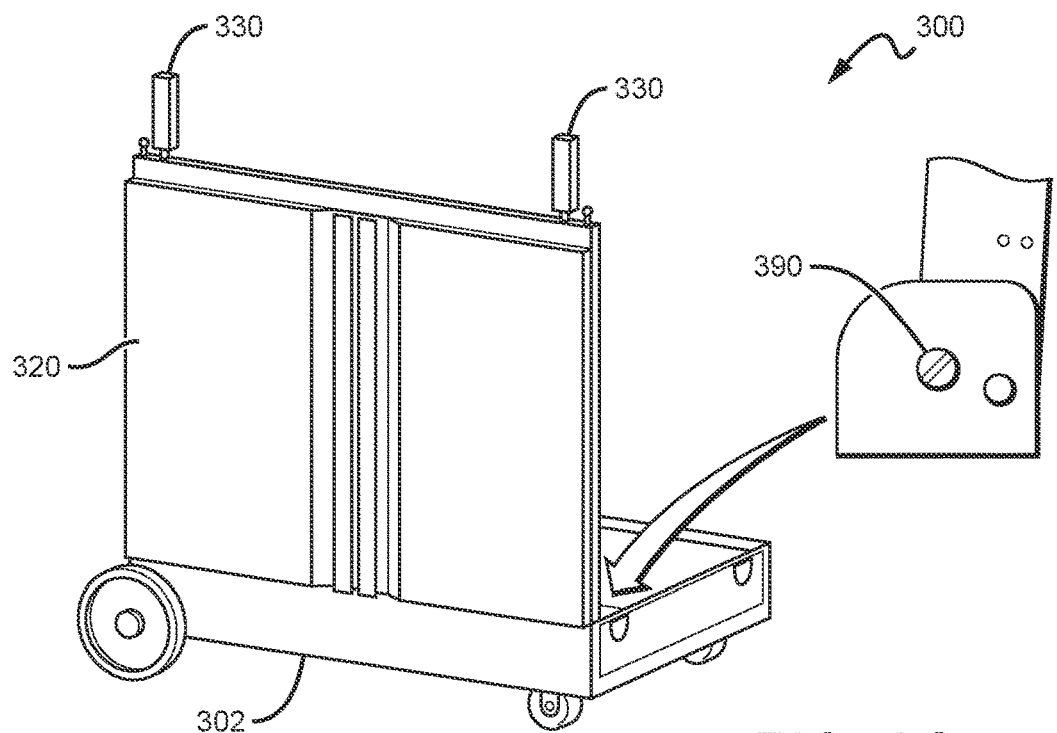
FIG. 3C depicts the grill cart of FIG. 3A with a front side frame in an upright position.

To assemble the cart 300, front side frame 320 can be rotated with respect to base frame 302 to its upright position as shown in FIG. 3C. As shown, the cam locks 330 extend vertically above a top surface of the front side frame 320 to thereby inhibit placement of a barbeque 310 on top of the cart 300 until the cam locks 330 are in place. The front side frame 320 can be locked automatically by a fastener 390 in the upright position when the front side frame 320 reaches that position. Contemplated fasteners include, for example, pin and slot mechanisms, clutches, collars, cams, shock cords, spring-buttons, snap collars, and set knobs.

Figure 3D:
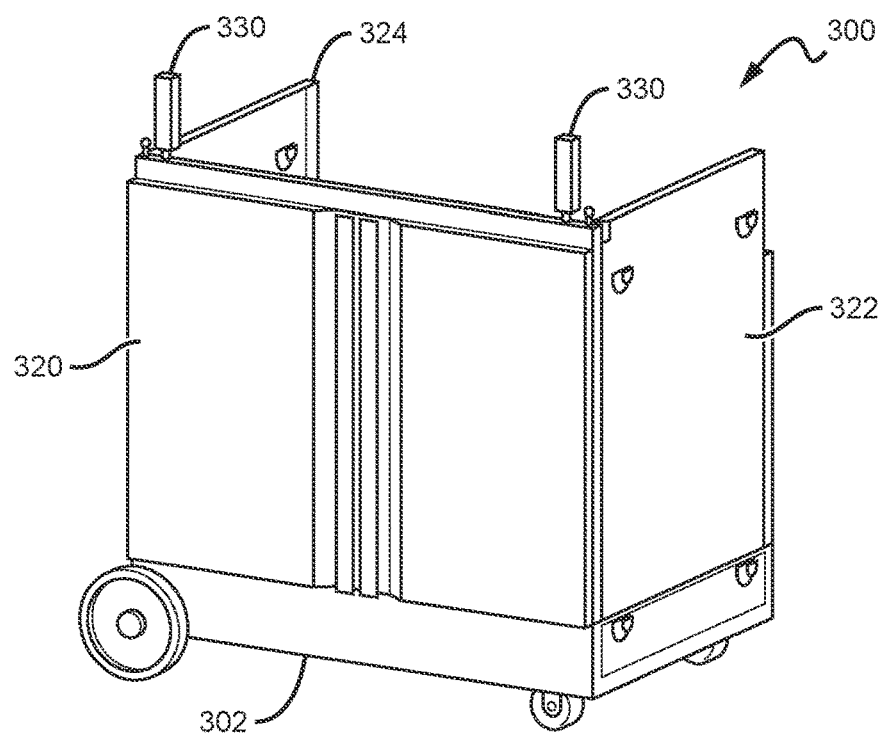
FIG. 3D depicts the grill cart of FIG. 3A with the front, right and left side frames in an upright position, and the locking mechanism in a first, unsecured position.
Figure 3E:
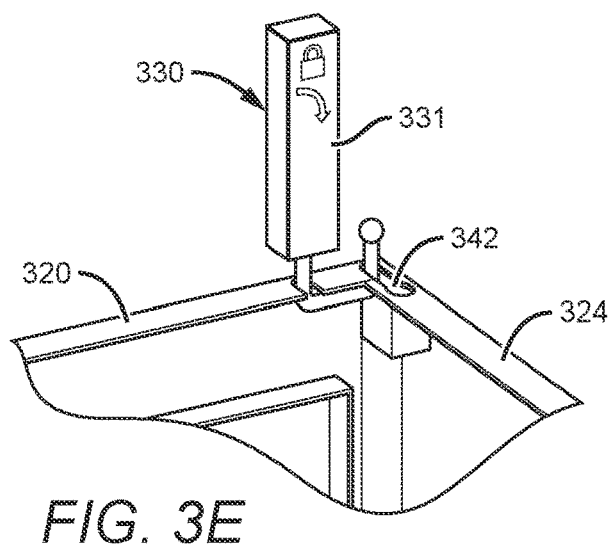
FIG. 3E depicts a close-up view of one of the locking mechanisms shown in FIG. 3D in the first, unsecured position.
Figure 3F:
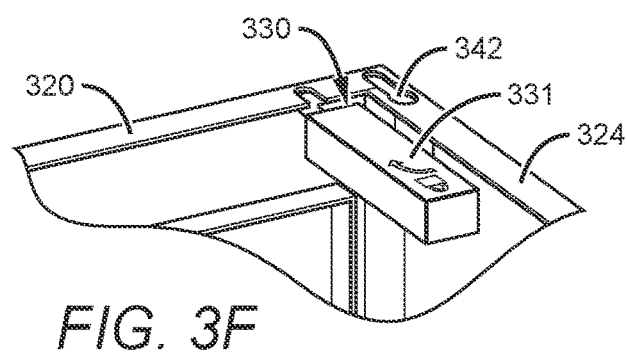
FIG. 3F depicts a close-up view of one of the locking mechanisms shown in FIG. 3D in a second, secured position.

As shown in FIG. 3D, left and right side frames 322, 324 can be rotated to their upright position. To secure the front side frame 320 to each of the left and right side frames 322, 324, each of the cam locks 330 can be rotated approximately 90 degrees until a portion of the cam lock is inserted within a recess or notch of a receiver 342. Compare FIG. 3E with FIG. 3F.

Figure 3G:
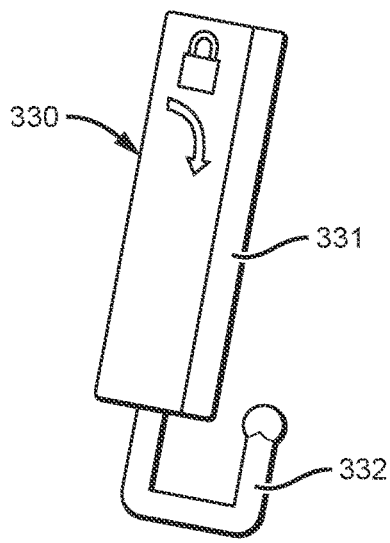
FIG. 3G depicts one embodiment of a locking mechanism.

FIG. 3G illustrates one embodiment of a cam lock 330 (locking device/mechanism) having a handle 331 and an L-shaped portion 332.

Figure 3H:
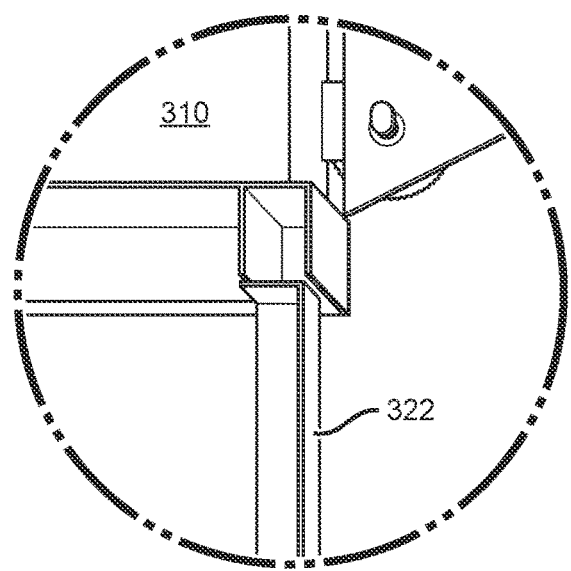
FIG. 3H depicts a notch on a barbeque that permits attachment of the barbeque with the grill cart of FIG. 3A when assembled.

Finally, as shown in FIG. 3H, the barbeque 310 preferably has a notch into which a top portion of each of the side walls can be placed, to better secure the barbeque 310 on top of the assembled cart 300.

Figure 4A:
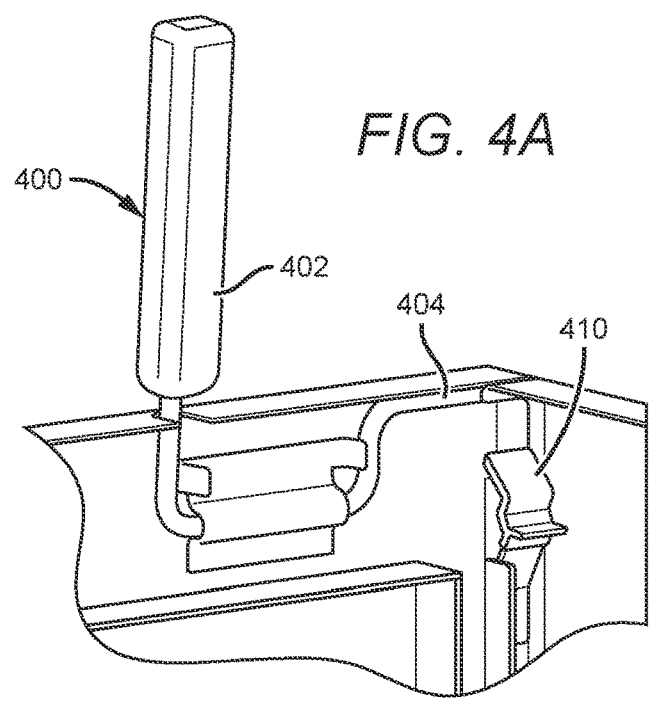
FIGS. 4A-4B depict another embodiment of a locking mechanism for use with a grill cart.
Figure 4B:
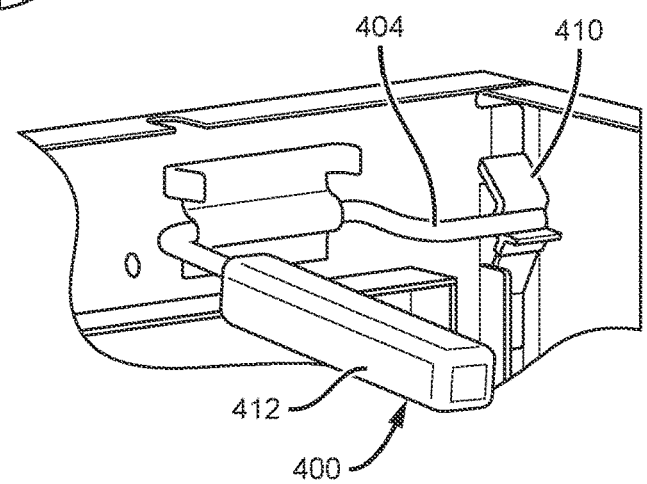

FIGS. 4A-4B illustrate another embodiment of a cam lock 400 having a handle 402. A bar 404 of the cam lock 400 interacts with a leaf spring 410, preferably made of stainless steel, when the cam lock 400 is rotated as shown in FIG. 4B. The spring 410 can be riveted to the side wall and have a low friction cover. When the bar 404 of the cam lock 400 is rotated, the bar 404 moves over and compresses the spring 410. A clip 412 can keep the cam lock secured to the side wall and in the first position shown in FIG. 4A until a user rotates the cam lock 400.

Figure 5A:
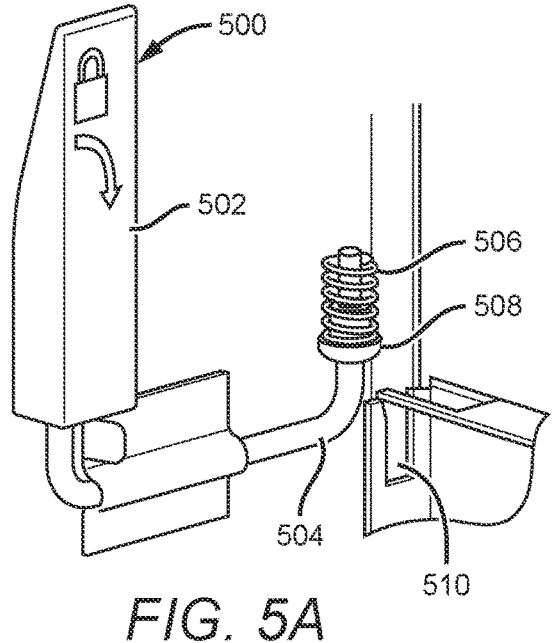
FIGS. 5A-5B depict yet another embodiment of a locking mechanism for use with a grill cart.
Figure 5B:
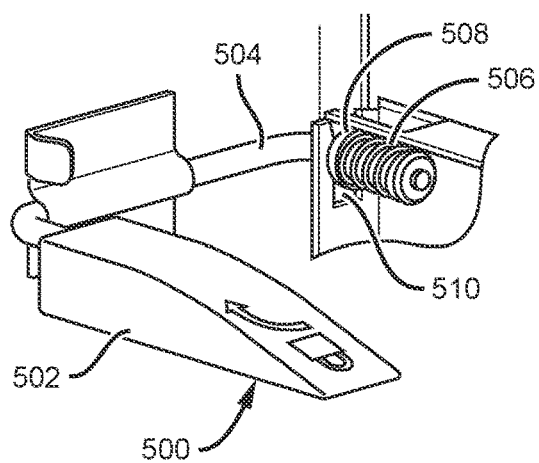

FIGS. 5A-5B illustrate another embodiment of a cam lock 500 having a handle 502. A bar 504 of the cam lock 500 comprises a coil spring 506 hat is prevented from backing off using a washer and clip. A low friction lock 508 can be placed below the coil spring 506. When the bar 504 is rotated, the low friction lock 508 moves over slides over keyway 510 in the side wall, as shown in FIG. 5B.

Figure 6A:
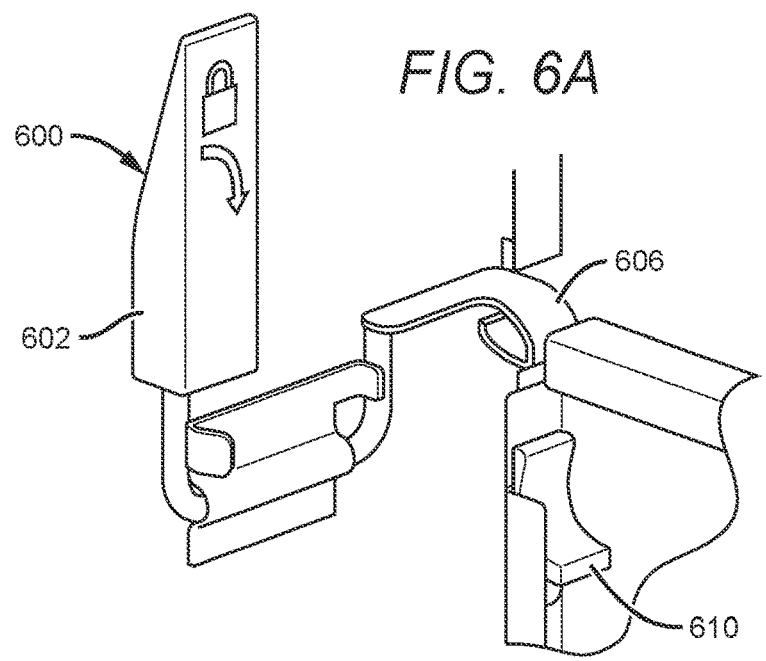
FIGS. 6A-6B depict yet another embodiment of a locking mechanism for use with a grill cart.
Figure 6B:
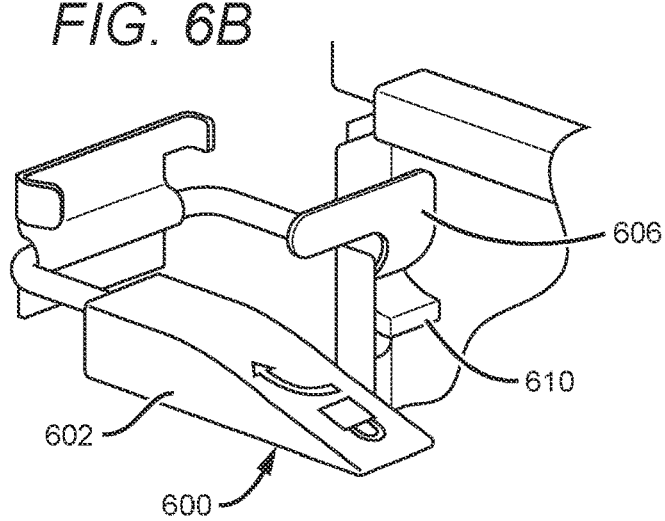

FIGS. 6A-6B illustrate another embodiment of a cam lock 600 having a handle 602. Cam lock 600 comprises a stainless steel leaf spring 606 that is configured to mate with a low friction lock 610 screwed to a side wall to couple the adjacent side walls, as shown in FIG. 5B.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A grill, comprising:
a firebox comprising a downward projection; and
a collapsible cart, comprising:
a base frame;
a first side frame coupled with the base frame, and configured to move from a collapsed, first position to an upright, second position;
a second side frame coupled with the base frame, and configured to move from a collapsed, first position to an upright, second position;
a third side frame coupled with the base frame, and configured to move from a collapsed, first position to an upright, second position;
a fourth side frame coupled with the base frame, and configured to move from a collapsed, first position to an upright, second position;
wherein the second side frame comprises a first locking device configured to secure the second side frame to the first side frame, when the first locking device is actuated from a first, non-engaged position to a second, engaged position;
wherein the third side frame comprises a second locking device configured to secure the third side frame to the first side frame, when the second locking device is actuated from a first, non-engaged position to a second, engaged position;
wherein the base frame defines a first slot configured to receive the downward projection from the firebox when the first side frame, the second side frame, the third side frame, and the fourth side frame are in the respective collapsed, first positions and the firebox is disposed on the cart thereby coupling the firebox to the collapsible cart;
wherein the second side frame or the third side frame defines a second slot configured to receive the downward projection from the firebox when the first side frame, the second side frame, the third side frame, and the fourth side frame are in the respective upright, second positions and the firebox is disposed on the cart thereby coupling the firebox to the collapsible cart.

2. The grill of claim 1, wherein each of the first and second locking devices comprises a cam lock.

3. The grill of claim 2, wherein each of the cam locks provides a mechanical advantage of at least 5:1.

4. The grill of claim 1, wherein a portion of each of the first and second locking devices that extends upwardly above the upper-most surface of the first side frame, when the first side frame is in the upright, second position and the first and second locking devices are in the first, non-engaged position.

5. The grill of claim 1, wherein the firebox comprises a second downward projection on an opposite side from the downward projection.

6. The grill of claim 5, wherein the second side frame defines the second slot configured to receive the downward projection from the firebox and the third side frame defines a third slot configured to receive the second downward projection when the first side frame, the second side frame, the third side frame, and the fourth side frame are in the respective upright, second positions and the firebox is disposed on the cart thereby coupling the firebox to the collapsible cart.

7. The grill of claim 1, further comprises third and fourth locking devices, such that the second and third side frames are secured to the fourth side frame when the third and fourth locking devices are actuated from a first, non-engaged position to a second, engaged position.

8. The grill of claim 7, wherein each of the third and fourth locking devices comprises a cam lock.

9. The grill of claim 1, wherein the first side frame comprises two cam lock receivers each configured to receive one of the first and second locking devices when the first or second locking device is in the second, engaged position.

10. The grill of claim 1, wherein the first side frame comprises first and second doors, each of which is hingedly coupled to the first side portion.

11. The grill of claim 1, wherein the first and second locking devices each comprise an engagement portion coupled to one frame and a notch defined in the adjacent frame, wherein the engagement portion is disposed within the notch to secure the two frames.

12. A grill, comprising:
a firebox comprising a first downward projection and a second downward projection, wherein the first downward projection and the second downward projection are disposed on opposite sides of the firebox; and
a collapsible cart, comprising:
a base frame;
a first side frame coupled with the base frame, and configured to move from a collapsed, first position to an upright, second position;
a second side frame coupled with the base frame, and configured to move from a collapsed, first position to an upright, second position;
a third side frame coupled with the base frame, and configured to move from a collapsed, first position to an upright, second position;
a fourth side frame coupled with the base frame, and configured to move from a collapsed, first position to an upright, second position;
a first locking device configured to secure the first side frame to the second side frame, when the first locking device is actuated from a first, non-engaged position to a second, engaged position;
a second locking device configured to secure the first side frame to the third side frame, when the second locking device is actuated from a first, non-engaged position to a second, engaged position;
wherein the base frame defines a first slot configured to receive the first downward projection from the firebox and a second slot configured to receive the second downward projection from the firebox when the first side frame, the second side frame, the third side frame, and the fourth side frame are in the respective collapsed, first positions and the firebox is disposed on the cart thereby coupling the firebox to the collapsible cart;
wherein the second side frame defines a third slot configured to receive the first downward projection from the firebox and the third side frame defines a fourth slot configured to receive the second downward projection from the firebox when the first side frame, the second side frame, the third side frame, and the fourth side frame are in the respective upright, second positions and the firebox is disposed on the cart thereby coupling the firebox to the collapsible cart.

13. The grill of claim 12, wherein a portion of each of the first and second locking devices that extends upwardly above the upper-most surface of the first side frame, when the first side frame is in the upright, second position and the first and second locking devices are in the first, non-engaged position.

14. The grill of claim 12, the collapsible cart further comprising:
a third locking device configured to secure the fourth side frame to the second side frame, when the fourth locking device is actuated from a first, non-engaged position to a second, engaged position; and
a fourth locking device configured to secure the fourth side frame to the third side frame, when the fourth locking device is actuated from a first, non-engaged position to a second, engaged position.

15. The grill of claim 12, wherein the firebox further comprises a third downward projection and a fourth downward projection, wherein the third downward projection is disposed on the same side of the firebox as the first downward projection and the fourth downward projection is disposed on the same side of the firebox as the second downward projection;
wherein the base frame defines a fifth slot configured to receive the third downward projection from the firebox and a sixth slot configured to receive the fourth downward projection from the firebox when the first side frame, the second side frame, the third side frame, and the fourth side frame are in the respective collapsed, first positions and the firebox is disposed on the cart thereby coupling the firebox to the collapsible cart;
wherein the second side frame defines a seventh slot configured to receive the third downward projection from the firebox and the third side frame defines an eighth slot configured to receive the fourth downward projection from the firebox when the first side frame, the second side frame, the third side frame, and the fourth side frame are in the respective upright, second positions and the firebox is disposed on the cart thereby coupling the firebox to the collapsible cart.

16. The grill of claim 12, wherein the base frame defines a perimeter that is equal a perimeter defined by the firebox.

17. The grill of claim 12, wherein the first and second locking devices each comprise an engagement portion coupled to one frame and a notch defined in the adjacent frame, wherein the engagement portion is disposed within the notch to secure the two frames.

18. A grill, comprising:
a firebox comprising a first downward projection, a second downward projection, a third downward projection, and a fourth downward projection, wherein the first downward projection and the second downward projection are disposed on a side of the firebox and the third downward projection and the fourth downward projection are disposed on a side of the firebox opposite from the first downward projection and the second downward projection, wherein the firebox defines a firebox perimeter; and
a collapsible cart, comprising:
a base frame defining a base perimeter;
a first side frame coupled with the base frame, and configured to move from a collapsed, first position to an upright, second position;
a second side frame coupled with the base frame, and configured to move from a collapsed, first position to an upright, second position;
a third side frame coupled with the base frame, and configured to move from a collapsed, first position to an upright, second position;

a fourth side frame coupled with the base frame, and configured to move from a collapsed, first position to an upright, second position;

a first locking device configured to secure the first side frame to the second side frame, when the first locking device is actuated from a first, non-engaged position to a second, engaged position;

a second locking device configured to secure the first side frame to the third side frame, when the second locking device is actuated from a first, non-engaged position to a second, engaged position;

wherein the base frame defines a first slot configured to receive the first downward projection from the firebox, a second slot configured to receive the second downward projection from the firebox, a third slot configured to receive the third downward projection from the firebox, a fourth slot configured to receive the fourth downward projection from the firebox when the first side frame, the second side frame, the third side frame, and the fourth side frame are in the respective collapsed, first positions and the firebox is disposed on the cart thereby coupling the firebox to the collapsible cart;

wherein the second side frame defines a fifth slot configured to receive the first downward projection from the firebox and a sixth slot configured to receive the second downward projection from the firebox, and the third side frame defines a seventh slot configured to receive the third downward projection from the firebox and an eighth slot configured to receive the fourth downward projection when the first side frame, the second side frame, the third side frame, and the fourth side frame are in the respective upright, second positions and the firebox is disposed on the cart thereby coupling the firebox to the collapsible cart;

wherein the base perimeter and the firebox perimeter are equal.

19. The grill of claim 18, wherein the first and second locking devices each comprise an engagement portion coupled to one frame and a notch defined in the adjacent frame, wherein the engagement portion is disposed within the notch to secure the two frames.

20. The grill of claim 18, the collapsible cart further comprising:

a third locking device configured to secure the fourth side frame to the second side frame, when the fourth locking device is actuated from a first, non-engaged position to a second, engaged position; and a fourth locking device configured to secure the fourth side frame to the third side frame, when the fourth locking device is actuated from a first, non-engaged position to a second, engaged position.

* * * * *